United States Patent
Fowler et al.

(10) Patent No.: US 9,000,756 B2
(45) Date of Patent: Apr. 7, 2015

(54) STEERING POSITION SENSOR AND METHOD FOR USING THE SAME

(75) Inventors: Clarence Walt Fowler, Elgin, TX (US); Robert Leonard Nelson, Jr., Austin, TX (US); Scott Porter, Liberty Hill, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 401 days.

(21) Appl. No.: 13/593,102

(22) Filed: Aug. 23, 2012

(65) Prior Publication Data

US 2014/0055128 A1 Feb. 27, 2014

(51) Int. Cl.
*G01B 7/30* (2006.01)
*G01D 5/14* (2006.01)

(52) U.S. Cl.
CPC ........................ *G01D 5/145* (2013.01)

(58) Field of Classification Search
CPC ..... G01D 5/145; G01D 5/2086; B62D 15/023
USPC ............. 324/207.11–207.18, 207.23–207.26, 324/244, 249, 260, 160–180; 600/409, 424; 702/145–155
See application file for complete search history.

(56) References Cited

U.S. PATENT DOCUMENTS

| | | | |
|---|---|---|---|
| 6,104,593 A | 8/2000 | Kawase et al. | |
| 6,404,182 B1 | 6/2002 | Kawase et al. | |
| 7,158,754 B2 * | 1/2007 | Anderson | 455/41.1 |
| 7,538,544 B2 * | 5/2009 | Lee | 324/207.25 |
| 7,598,736 B2 | 10/2009 | Zimmer et al. | |
| 7,932,716 B2 | 4/2011 | Ruetz | |
| 8,004,274 B2 * | 8/2011 | Budde et al. | 324/207.17 |
| 2001/0009367 A1 | 7/2001 | Seitzer et al. | |
| 2010/0057299 A1 | 3/2010 | Burgdorf et al. | |

FOREIGN PATENT DOCUMENTS

| WO | WO-03067181 A2 | 8/2003 |
|---|---|---|
| WO | WO-2004072653 A2 | 8/2004 |

* cited by examiner

*Primary Examiner* — Arleen M Vazquez
*Assistant Examiner* — Robert P Alejnikov, Jr.
(74) *Attorney, Agent, or Firm* — Schwegman Lundberg & Woessner, P.A.

(57) ABSTRACT

A rotation sensor assembly includes a rotated component rotatably coupled with a base. The rotation sensor assembly includes a transmitter and a receiver. The transmitter is coupled with the base or the rotated component. The transmitter generates a magnetic field including a sinusoidally time-varying dipole near-field corresponding to an excitation signal having a first phase value. The receiver is coupled with the other of the rotated component or the base. The receiver detects the magnetic field and generates a reception signal based on the magnetic field with a second phase value corresponding to a rotation angle of the rotated component relative to the base. The receiver is mechanically isolated from the transmitter. A rotation angle module is coupled with the transmitter. The rotation angle module, for instance a phase detector, measures the rotation angle of the rotated component based on the phase difference in the first and second phase values.

22 Claims, 10 Drawing Sheets

STEERING POSITION SENSOR AND METHOD FOR USING THE SAME

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak. All Rights Reserved.

TECHNICAL FIELD

This document pertains generally, but not by way of limitation, to orientation sensors and instruments.

BACKGROUND

Mechanical and electromechanical instruments coupled between moving components of vehicles are used to measure the steering angle of one or more components, such as the wheels, relative to the body of the vehicle. In some examples, the instruments include potentiometers, variable resistors and the like to measure corresponding voltage and resistance and associate these measurements with the steering angle of a vehicle component. Each of these instruments requires a mechanical interface between moving components of the vehicle, such as a wheel and a static portion of the body (e.g., the suspension). The mechanical interface is subject to contamination from dirt, water and the like and is also susceptible to violent contact from flying rocks, field debris, work site debris and other vehicle components. Contamination or physical damage to the mechanical interface may interfere with or cause the instrument to fail.

A radio transmitting antenna creates electric and magnetic fields whose amplitudes vary with time, typically alternating polarity in a sinusoidal manner. Very close to the antenna, the fields produced closely resemble time-varying versions of the static fields that would be produced by unchanging antenna voltages or currents. These fields, called "near fields", are complicated and include both radial and circumferential components. The fields diminish in strength as the cube of the distance from the antenna, if not faster.

The variation in time of near fields creates, in a way that Maxwell's equations describe, another, simpler field structure, that of a radio wave. The radio wave is negligible in strength near the antenna. It diminishes as the square of the distance from the antenna, more slowly than the near field. It dominates any near field at distances that are substantially greater than the wavelength (velocity divided by frequency).

The radio wave comprises the electric and magnetic far fields, whose directions are perpendicular to the wave's direction of travel and perpendicular to each other. The waveforms of the electric and magnetic far fields are the same at any one point in the spherical wave front around the transmitter and are related to each other in strength by the "wave impedance" of whatever medium the wave is traveling through, which for air is virtually that of free space, or about 377 ohms.

Radio direction finding (RDF) has long been used to measure the orientation of airplanes relative to a radio transmitting antenna. RDF uses the far-field radio wave, typically vertically polarized, that is, with the electric field vertical and the magnetic field horizontal, such as that transmitted by a medium-frequency (around 1 megahertz) broadcasting station, whose wavelength is around 300 meters. The airplane is far enough from the transmitter, that is, at least several wavelengths, so that it is in the antenna's far field, that is, in the radiated wave.

The RDF receiver on the airplane operates by finding the direction of the radiated magnetic field. The magnetic field must be in a circumferential direction along the spherical wave front, that is, transverse to the wave's direction of travel, and therefore exactly 90 degrees from the radial direction extending from the airplane to the transmitter. This then reveals the orientation of the airplane relative to the transmitter. RDF thus depends on the radio wave's relatively simple structure and cannot be relied upon to work properly in the near field.

OVERVIEW

The present inventors have recognized, among other things, that these difficulties are avoided by using a magnetic near field at much lower frequencies, whose wavelength is far longer than the vehicle dimensions. In one example, the inventors have used a frequency of 187.5 kilohertz, with a corresponding wavelength of about 1 mile. The inventors have accordingly devised a novel arrangement of transmitting and receiving coils and associated signal processing that exploit the complicated near field of a magnetic dipole to measure rotation angles accurately, in a manner that operates on quite different principles from radio direction finding and can measure the rotation of the transmitter as well as that of the receiver. A prophetic example is provided herein further describing the mathematical analysis of magnetic near fields in this sensor assembly arrangement for the determination of a rotation angle of one component relative to another nearby component.

In one example, the sensor assembly includes a transmitter coupled with one of the base or the rotated component, the transmitter generates a magnetic field including a sinusoidally time-varying dipole near-field corresponding to an excitation signal having a first phase value. A receiver is coupled with the other of the rotated component or the base. The receiver is configured to detect the magnetic field and generate a reception signal based on the magnetic field with a second phase value corresponding to the rotation angle of the rotated component, wherein the receiver is mechanically isolated from the transmitter. A rotation angle module is coupled with the transmitter. The rotation angle module includes a phase detector configured to measure the rotation angle of the rotated component based on the phase difference in the phase values of a reference signal and a reception signal generated by the receiver.

Mechanical isolation of the receiver from the transmitter, for instance without a mechanical or electrical linkage such as wiring, potentiometers and the like spanning a steering linkage (e.g., a gap between portions of the overall device and the like) prevents the striking of the sensor assembly by stones, soil, debris and the like and further prevents the gradual accrual of dirt, oil and the like on sensitive sensor components. In one example, the receiver and the transmitter are housed and protected within hardened enclosures, and only a reference signal coupling extends between the receiver and transmitter. The reference signal coupling (including wiring and the like) extending between the transmitter and the receiver is positioned away from a steering linkage, gap between components and the like susceptible to reception of debris.

Moreover, the present inventors have recognized that a problem to be solved can include sensing steering and rotation angles with a transmitter and receiver that are positioned substantially adjacent to one another, for instance within around two meters. In an example, the present subject matter can provide a solution to this problem, for instance with the generation and reception of magnetic near fields (e.g., sinusoidal time-varying dipole near-fields) by the transmitter and the receiver. The magnetic near fields, having circumferential and radial components, facilitate the sensing and measurement of rotation at around and within two meters, for instance through the measurement of phase difference.

The use of magnetic near-fields, as described herein, avoids the use of radio direction finding, normally used over relatively large distances, in combination with complicated high frequency components to facilitate use at shorter distances needed with a steering system (or other relatively close components). For instance, in order to create a radio wave at the much shorter distances, for instance about one meter, the transmitter frequency must be far higher than used for airplanes. The wavelength must be short compared to the dimensions of the steering mechanism, or on the order of 100 millimeters, which implies a frequency of about 3 gigahertz. Such a "miniaturized" RDF is not attractive because design and fabrication become more difficult, as is typical of circuits operating at such high frequencies, since the position and shape of circuit elements and antenna structures becomes very significant. Furthermore, at high frequencies, metal objects distort or reflect the radio waves to a greater extent than at low frequencies, leading to angle-measurement errors or complete loss of measurement capability.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
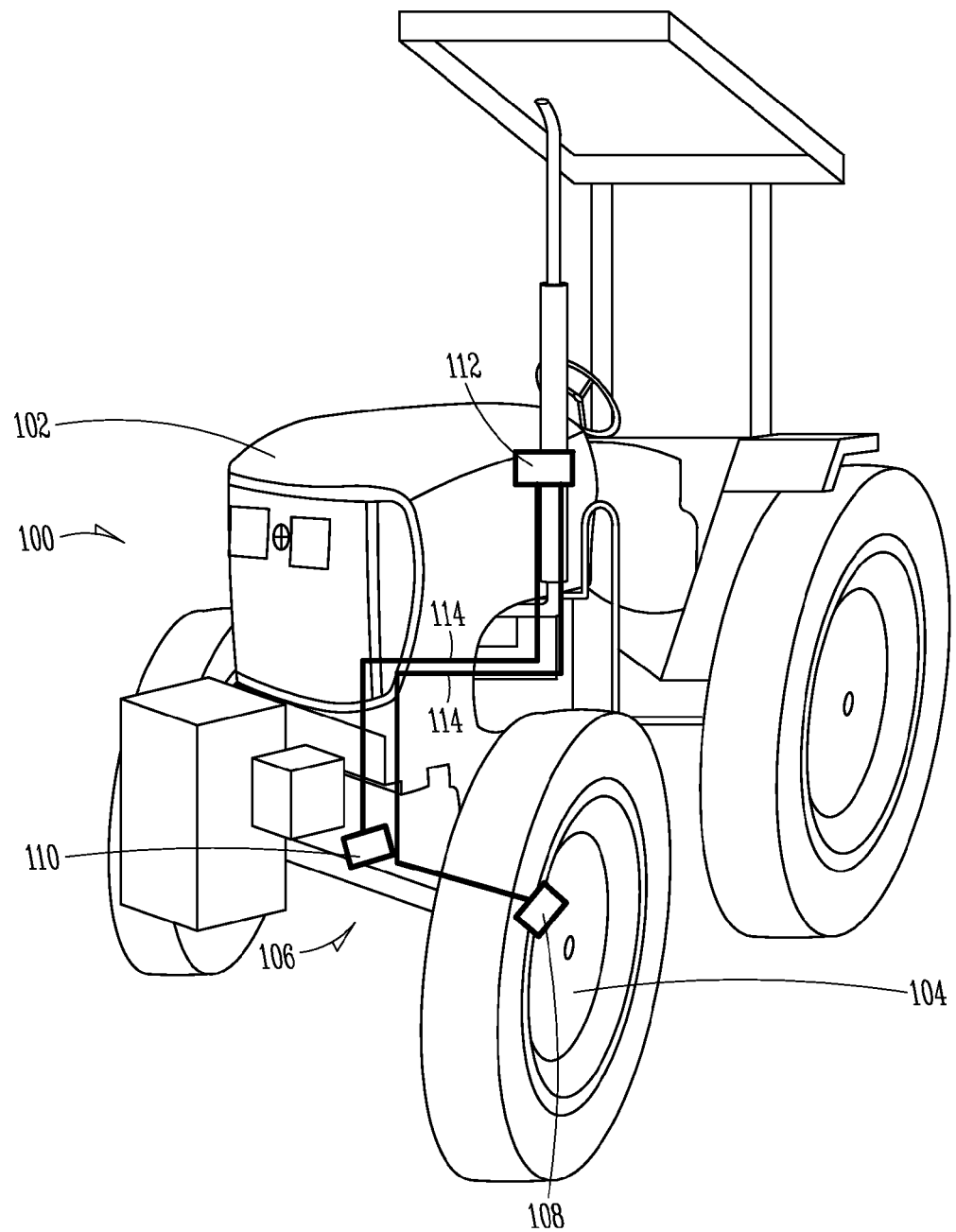
FIG. 1 is an isometric view of one example of a vehicle including a steering system.

FIG. 1 shows one example of a vehicle 100 such as a tractor. As will be described herein the vehicle 100 includes but is not limited to any powered or unpowered device such as a vehicle, implement or the like having a first component rotatable relative to a second component. For instance, the vehicle 100 in one example includes a static component having a component such as an arm, rotor or the like that is rotatable relative to the static component. Alternatively, each of the components of the system are rotatable relative to each other or static frame of reference (e.g., a portion of the vehicle such as a steering knuckle, upright or McPhearson Strut rotates, as does the vehicle body, relative to a static frame of reference such as the ground). Referring again to FIG. 1, the vehicle 100 includes an assembly base 102 and a steered component 104. As shown in FIG. 1, the steered component 104 is in one example a wheel or steering knuckle rotatably coupled with the assembly base 102, such as a vehicle body.

As further shown in FIG. 1, a rotation position sensor assembly, for instance a steering position sensor assembly 106, is coupled between the assembly base 102 and the steered component 104. The steering position sensor assembly 106 includes a transmitter 108 and a receiver 110 coupled with the opposed steered component 104 and assembly base 102. In another example, the transmitter 108 is coupled with the assembly base 102 and the receiver is instead coupled with the steered component 104. As will be further described below, in at least one example, the transmitter 108 includes a transmitting coil assembly including one or more transmission coils therein. In another example, the receiver 110 includes a receiving coil assembly having one or more receiving coils therein. The steering position sensor assembly 106 further includes a steering angle module 112 (e.g., a rotation angle module and the rotational position detected corresponds to the steering angle of one or more of the components) coupled with each of the transmitter 108 and the receiver 110 by way of a signal coupling 114.

As shown in FIG. 1, the transmitter 108 and the receiver 110 are not coupled with one another. Instead each of the transmitter and receiver 108, 110 is electrically coupled, for instance with the signal coupling 114, with the steering angle module 112. That is to say, linkages, electronic components and the like are not coupled between the transmitter and the receiver 108, 110. This arrangement of the transmitter and the receiver 108, 110, for instance within separated hardened enclosures, substantially prevents damage to either of the components of the steering position sensor assembly 106, for instance during operation of the vehicle 100. Stated another way, mechanical linkage components of other steering sensor assemblies, electronic components and the like are not present between the transmitter 108 and the receiver 110. Because no mechanical or electrical linkages are exposed to the exterior environment of the vehicle 100 at the interface of the steered component 104 and the assembly base 102 the steering position sensor assembly 106 operates reliably and with minimal risk of damage from operation of the vehicle 100. Easily damaged components, such as mechanical linkages, variable resistors, potentiometers and the like, are absent from the steering position sensor assembly 106 between the steered component 104 and the steered component 102.

Figure 2:
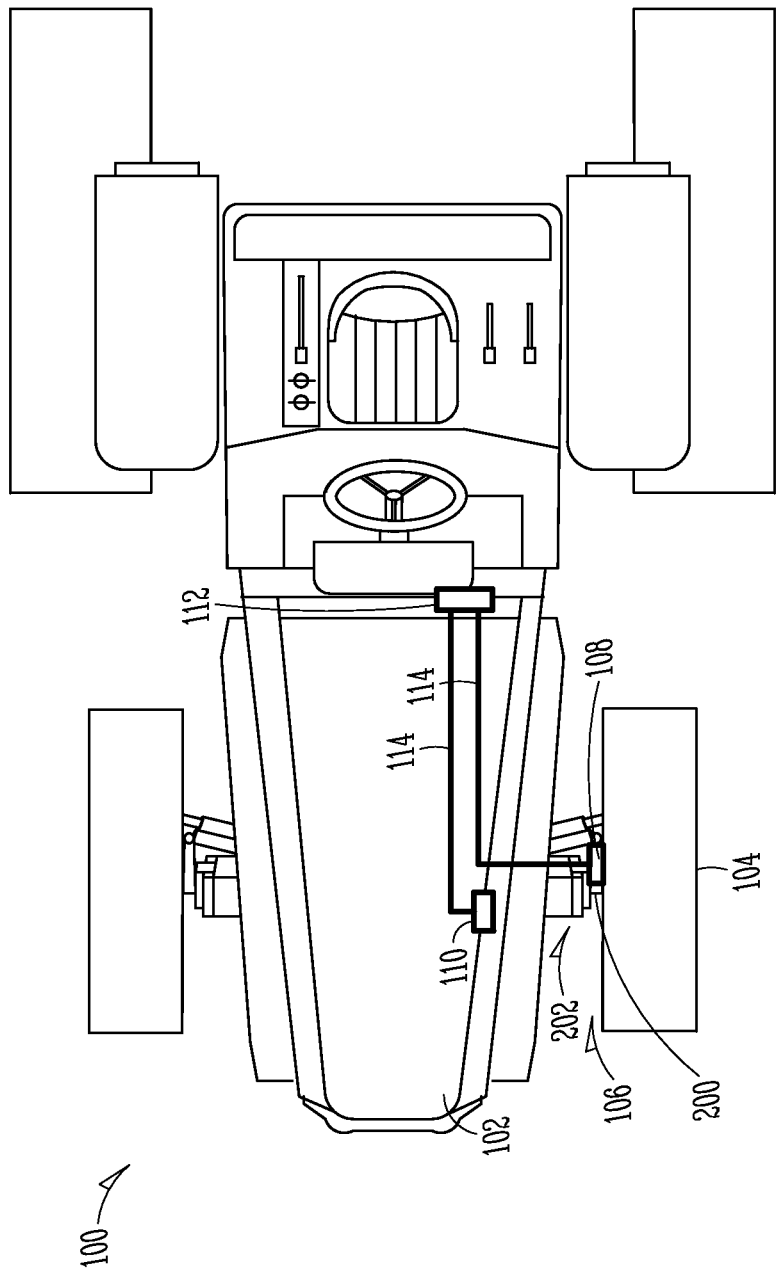
FIG. 2 is a top view of one example of a steering system including a steering sensor system.

Referring now to FIG. 2, the vehicle 100 is shown again in a top view. The steering position sensor assembly 106 (a rotation position sensor measuring a steering angle) includes the transmitter 108 coupled with the steered component 104, and the receiver 110 is coupled with the assembly base 102. As described herein, rotation position sensor assemblies and steering position sensor assemblies encompass identical subject matter including the assemblies described herein configured to detect and measure the rotational angle of one component relative to another. As further shown in FIG. 2, in one example, the transmitter 108 is coupled with a steering knuckle 200, for instance, a portion of the wheel assembly coupled with the wheel as shown. The steering knuckle 200 is a rotatable fixture coupled with the steering linkage 202 that facilitates the rotation of the wheel relative to the assembly base 102. Rotation of the steering knuckle 200 varies directly with corresponding rotation of the wheel. For instance, as the wheel is directed along a particular angle relative to the assembly base 102 the steering knuckle 200 including, for instance, the transmitter 108 thereon is correspondingly rotated the same degree measure.

As again shown in FIG. 2, the transmitter 108 and the receiver 110 are separated from one another. A signal coupling 114, for instance, cabling or the like extends between each of the transmitter 108 and the receiver 110 and the steering angle module 112. The signal coupling 114 is in one example used to generate and transmit an excitation signal having a specified phase value to the transmitter 108. The transmitter thereafter generates a magnetic near-field having a corresponding phase value according to the phase value provided in the excitation signal. The receiver 110 generates a corresponding reception signal that is then transmitted along the signal coupling 114 to the steering angle module 112. In one example, the reception signal transmitted along the signal coupling 114 corresponds to the magnetic near-field as sensed by the receiver 110 and having a second phase value based on the rotation of the transmitter 108 or receiver 110 relative to one another. The steering module 112 is configured as described herein to compare the phase values of the excitation signal, for instance transmitted to the transmitter 108, with the second phase value transmitted in the reception signal from the receiver 110. By measuring the difference in phase between the excitation signal and the reception signal the steering angle module 112 determines the steering angle of the transmitter 108 (e.g., including the steered component 104 such as the steering knuckle 200 wheel or the like).

Figure 3A:
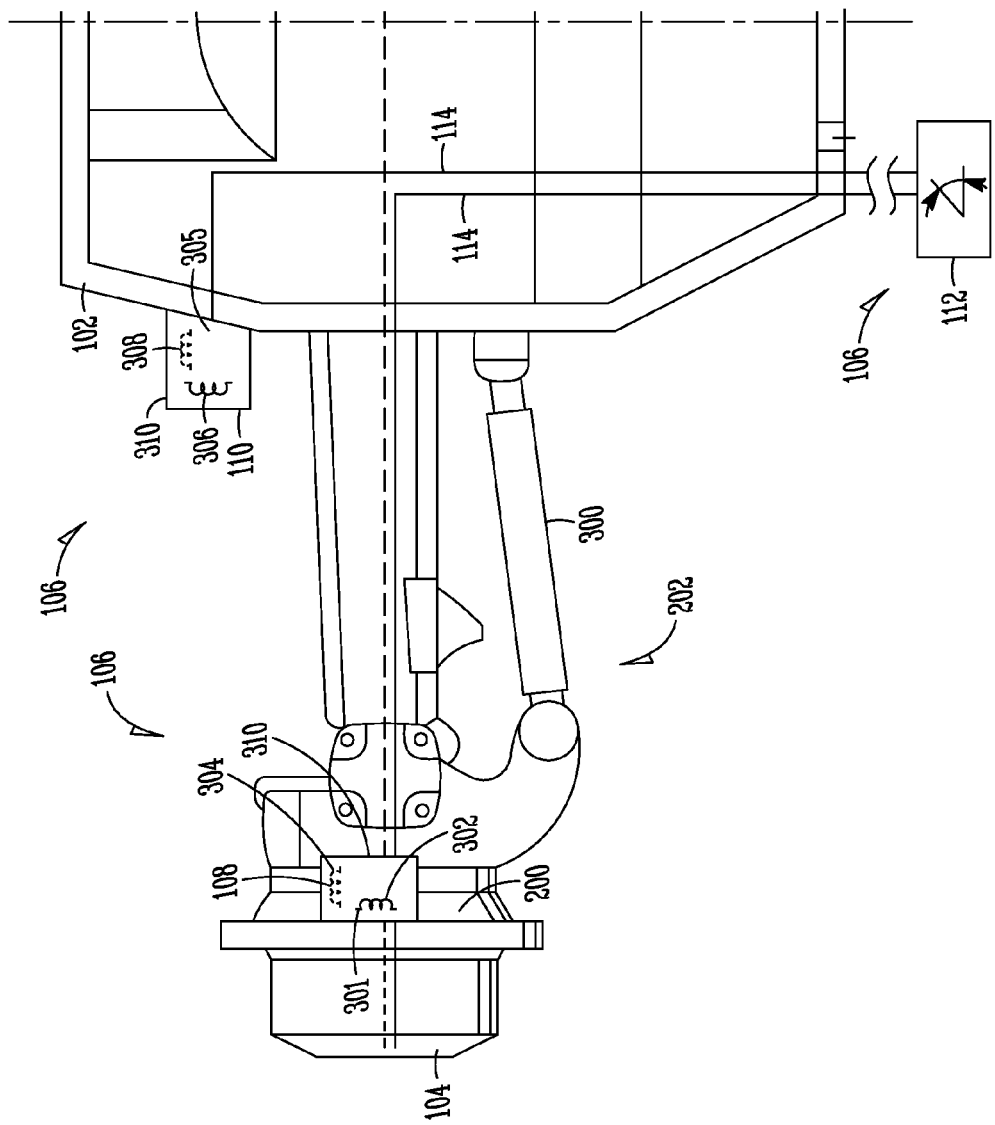
FIG. 3A is a schematic view of a steering sensor system.
Figure 3B:
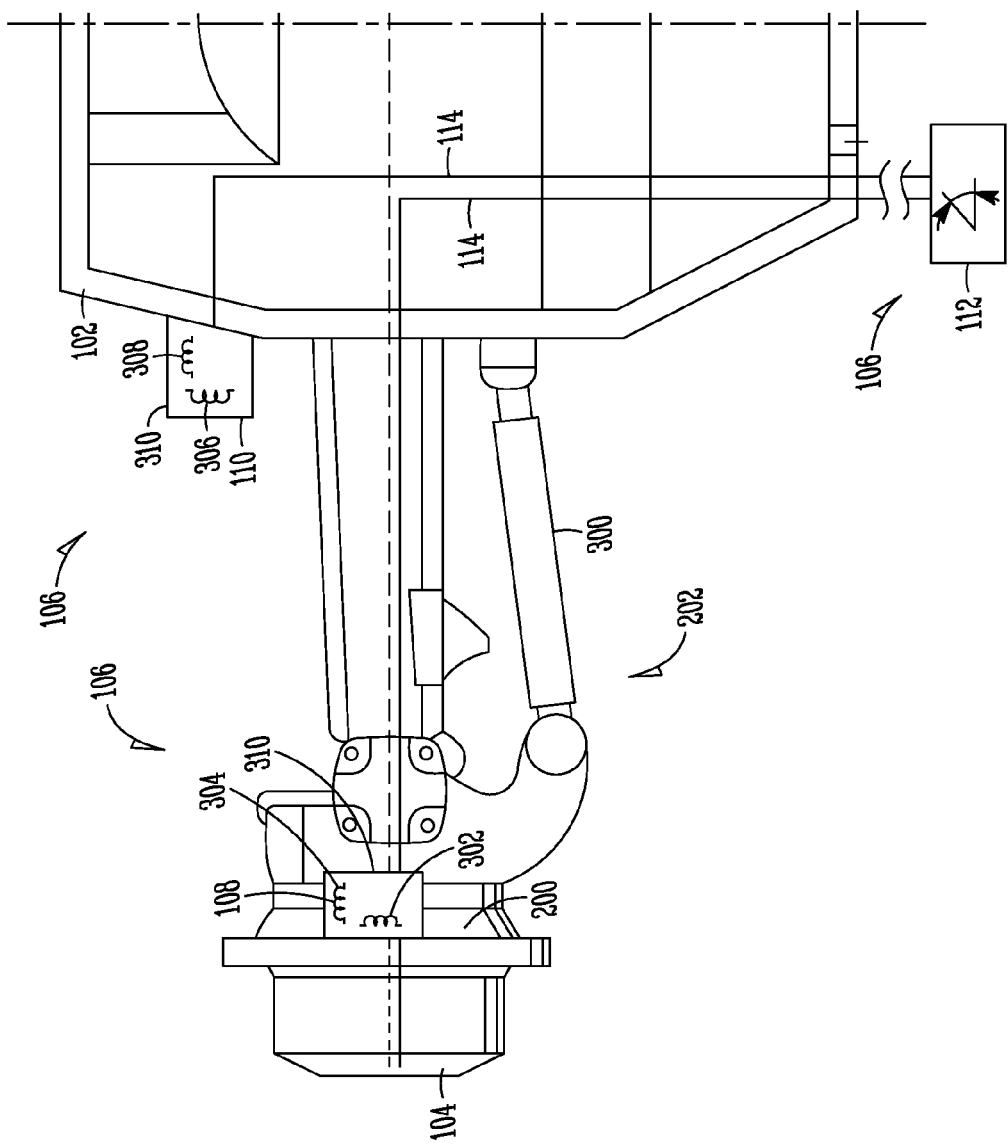
FIG. 3B is a schematic view of the steering sensor system shown in FIG. 2.

FIGS. 3A and 3B show detailed top views of a portion of the vehicle 100. As shown, for instance in FIG. 3A, a close up portion of the steering linkage 202 including for instance the steering knuckle 200 coupled with the linkage 202 is provided. The steering linkage 202 extends between the steering knuckle 200 and the assembly body 102. In the example shown, a piston 300 is provided to rotate the steered component 104 such as the steering knuckle 200 relative to the assembly body 102.

As previously described, the steering position sensor assembly 106 includes a transmitter 108 and a receiver 110 each coupled with one of the assembly body 102 and the steered component 104. As shown in FIG. 3A, in one example, the transmitter 108 including, for instance, a transmitting coil assembly 301 is coupled with the steered component 104, such as the steering knuckle 200. As further shown in FIG. 3A, the receiver 110 is coupled with the assembly body 102 and includes a receiving coil assembly 305.

As shown in FIG. 3A, each of the transmitting and receiving coil assemblies 301, 305 includes one or more transmitting or receiving coils, respectively. For instance, as shown in FIG. 3A the transmitting coil assembly 301 of the transmitter 108 includes a first transmitting coil 302 and an optional second transmitting coil 304. In a similar manner, the receiving coil assembly 305 associated with the assembly base 102 includes a first receiving coil 306 and an optional second receiving coil 308. Optionally, instead of the first and second receiving coils 306, 308 sensors, such as Hall Effect sensors are provided. Each of the receiving and transmitting coils 306, 308 and 302, 304 are, in one example, positioned within hardened enclosures 310. As will be described in further detail below, where the transmitting coil assembly 301 includes first and second transmitting coils 302, 304 the receiving coil assembly 305 includes one or both of the first and second receiving coils 306, 308. Where the receiving coil assembly 305 only includes the first receiving coil 306 the receiving coil assembly 305 is configured to sense the magnetic field generated by the transmitting coil assembly 301 and the steering angle module 112 is able to determine the rotation of the steered component 104 relative to the assembly base 102. Stated another way, in a configuration with the transmitting coil assembly 301 having two or more coils 302, 304 and the receiving coil assembly 305 having the first receiving coil 306 (and not the second receiving coil 308) the steered component 104 is better suited to be the rotating component including the transmitting coil assembly 301 thereon. As will be described in further detail below, the reception signal generated by the receiver 110 will depend on both the relative angle of the transmitter 108 and the receiver 110 but it will only very linearly with rotation of the transmitter 108.

In a similar manner, the transmitter and the receiver 108, 110 are optionally reversed, for instance with the transmitter 108 positioned on the assembly base 102 and the receiver 110 positioned on the steered component 104. The receiving coil assembly 305 coupled with the steered component 104 (e.g., the steering knuckle 200) includes the first and second receiving coils 306, 308. The transmitting coil assembly 301 associated with the assembly base 102 includes at least the first transmitting coil 302 and optionally includes the second transmitting coil 304. In this arrangement because the receiving coil assembly 305 includes the first and second receiving coils 306, 308 it is best suited for being the rotating member of the steering position sensor assembly 106. Stated another way, and as previously described, while the reception signal generated by the receiver 110 will depend on both the rotation of the transmitter 108 and the receiver 110 the reception signal will very linearly only according to the rotation of the receiver 110, for instance on the steering knuckle 200. In each of these examples, where one of the receiver 110 and the transmitter 108 includes two coils and the other of the transmitter 108 and the receiver 110 includes one coil it is best when using a magnetic near field that the rotating component include the two or more coils thereon while the non-rotating components such as the assembly base 102 includes the single coil thereon.

As further shown in FIGS. 3A (and 3B), the transmitting coil assembly 301 and the receiving coil assembly 305 are parallel. Stated another way, the coils 302, 304 or 306, 308 form a coil plane coincident with the longitudinal axes of the respective coils (the coil plane in FIGS. 3A and 3B is parallel to the page). The coils of the other assembly 306, 308 or 302, 304 are parallel to this coil plane, and at least one of the transmitting or receiving coils remains parallel to the coil plane during rotation. By maintaining at least one of the coil assemblies 301, 305 in a parallel orientation during rotation, the steering angle is accurately and reliably determined.

Referring now to FIG. 3B, the portions of the vehicle 100 shown in FIG. 3A are provided again. In this example, each of the transmitter 108 and the receiver 110 include corresponding transmitting and receiving coil assemblies 301, 305 each having first and second coils. For instance, the transmitting coil assembly 301 includes first and second transmitting coils 302, 304 and the receiving coil assembly 305 includes first and second receiving coils 306, 308. As previously described with regard to FIG. 3A, one of the transmitter or receiver 108, 110 includes dual transmitting or receiving coils and the opposed transmitter or receiver 108, 110 includes one or more transmitting or receiving coils. In the arrangement shown in FIG. 3B, each of the transmitter and the receiver includes two or more coils and each of the transmitter and the receiver 108, 110 is usable as the rotating member of the steering position sensor assembly 106. Stated another way, the rotation of either or both of the transmitter and the receiver 108, 110 is measurable with this arrangement. That is to say, the second phase value of the reception signal generated by the receiving coil assembly 305 depends on the angle of each of the steered component 104 and the assembly base 102. The phase of the reception signal depends linearly on the rotation angle of the steered component 104 and the assembly base 102. In other words, the second phase value of the reception signal varies from the first phase value according to the rotation of one or both of the steered component 104 and the assembly base 102 relative to the other of the assembly base 102 and the steered component 104.

As will be described in further detail below, the two transmitting coils 302, 304 associated with the transmitting coil assembly 301 generate respective magnetic field components (e.g., magnetic near-fields) that have corresponding amplitude and phase shifts. When these component magnetic fields are combined the resulting magnetic field is a rotating magnetic near-field that increases its rotation angle according to the first phase value of the excitation signal provided to the transmitting coil assembly 301 (for instance, from the steering angle module 112). The receiving coil assembly 305, for instance, incorporated within the receiver 110 receives the rotating magnetic near-field and generates a corresponding reception signal having a second phase value that varies according to rotation of at least one of the transmitting or receiving coil assemblies 301, 305 (including relative rotation of the magnetic near-field) relative to the opposed receiving or transmitting coil assembly. The receiving coil assembly 305 generates a reception signal having a second phase value that is based on the rotation of one or more of the transmitting or receiving coil assemblies 301, 305. The steering angle module 112 compares the excitation signal with the first phase value received by way of the signal coupling 114 with the reception signal having the second phase value and determines the difference between the first and second phase values. Because the second phase value varies according to rotation of the least one of the coil assemblies this difference between the phase values corresponds to the angle of the steered component 102 relative to the assembly base 104 (or the rotation of the assembly base relative to the steered component) depending on the arrangement of the transmitter and the receiver.

In another example, where the reception signal is generated by the first and second receiving coils 306, 308, for instance, as shown in FIG. 3B (and optionally shown in FIG. 3A) the reception signal includes the equally weighted sum of the respective component reception signals generated by each of the first and second receiving coils 306, 308 and the two component signals generated by the receiving coils 306, 308 are phase shifted an identical amount to the phase shift of the transmitting coils 302, 304 (for instance, a 90 degree net phase shift). The two component reception signals are thereafter summed to provide a composite reception signal for use by the steering angle module 112 for comparison with the excitation signal received from the transmitting coil assembly 301.

As described in the examples above and shown in FIGS. 3A, B each of the transmitting or receiving coil assemblies 301, 305 may include at least two coils. In other examples though, the one or more coils of one or more of the transmitting or receiving coil assemblies includes two or more coils at varying angles relative to the other coils in the respective assemblies. Any number of co-located coils (e.g., associated with the transmitting or receiving coil assemblies 301, 305) whose axes are within the same plane and whose axes are not all aligned in the same direction may be excited as transmitters or summed as receivers according to a set of weights to generate fields or receive signals equivalent to two virtual transmitting coils or two virtual receiving coils whose axes are at right angles to each other, respectively. That is to say, where two or more transmitting or receiving coils are described herein, such coils are in at least one example considered virtual coils that include two or more coils that are optionally at non-ninety degree angles relative to one another. A prophetic example of weighting and summation of such signals generated from such an arrangement of coils is provided below. The mathematical analysis provided herein may be reworked as needed for conversion of any number of actual coils and their corresponding signals at various angles to two virtual coils and signals generated by the same (such as coils 302, 304 and 306, 308).

The prophetic example follows from the premise that the sum of any two sinusoidal functions of the same angle, whatever their individual phase angles, is itself a sinusoid, and that any such sinusoidal function may be resolved into two functions that are proportional to the sine and cosine of that angle:

$$v_x = \sum_i w_{x,i} v_i$$

$$v_y = \sum_i w_{y,i} v_i$$

where $v_x$ and $v_y$ are the transmitted field strength synthesized for the two virtual coils or the received signal synthesized for the two virtual coils, $v_i$ is the actual transmitted field strength of the ith actual coil or the received signal from the ith actual coil, and $w_{x,i}$ and $w_{y,i}$ are the weights corresponding to the ith actual coil and are used to synthesize virtual coils x and y, respectively.

The constraints on the weights are:

$$\sum_i w_{x,i} \sin(\theta_i) = 0$$

$$\sum_i w_{x,i} \cos(\theta_i) = v_x$$

$$\sum_i w_{y,i} \cos(\theta_i) = 0$$

$$\sum_i w_{y,i} \sin(\theta_i) = v_y$$

Where $\theta_i$ is the angle from the x axis of the ith actual coil. These conditions may be satisfied by a number of combinations of weights. For example, if the angles $\theta_i$ are uniformly spaced around a complete circle, that is, $\theta_i = (i-1)120$ deg then $w_{x,1} = 1$
$w_{x,2} = 0$
$w_{x,3} = 0$
$w_{y,1} = 0$
$w_{y,2} = 3^{0.5}$
$w_{y,3} = -3^{0.5}$ or $w_{x,1} = 0$
$w_{x,2} = 1$
$w_{x,3} = 1$
$w_{y,1} = 0$
$w_{y,2} = 3^{0.5}$
$w_{y,3} = -3^{0.5}$ or in fact any linear combination of these will satisfy the conditions.

Figure 4:
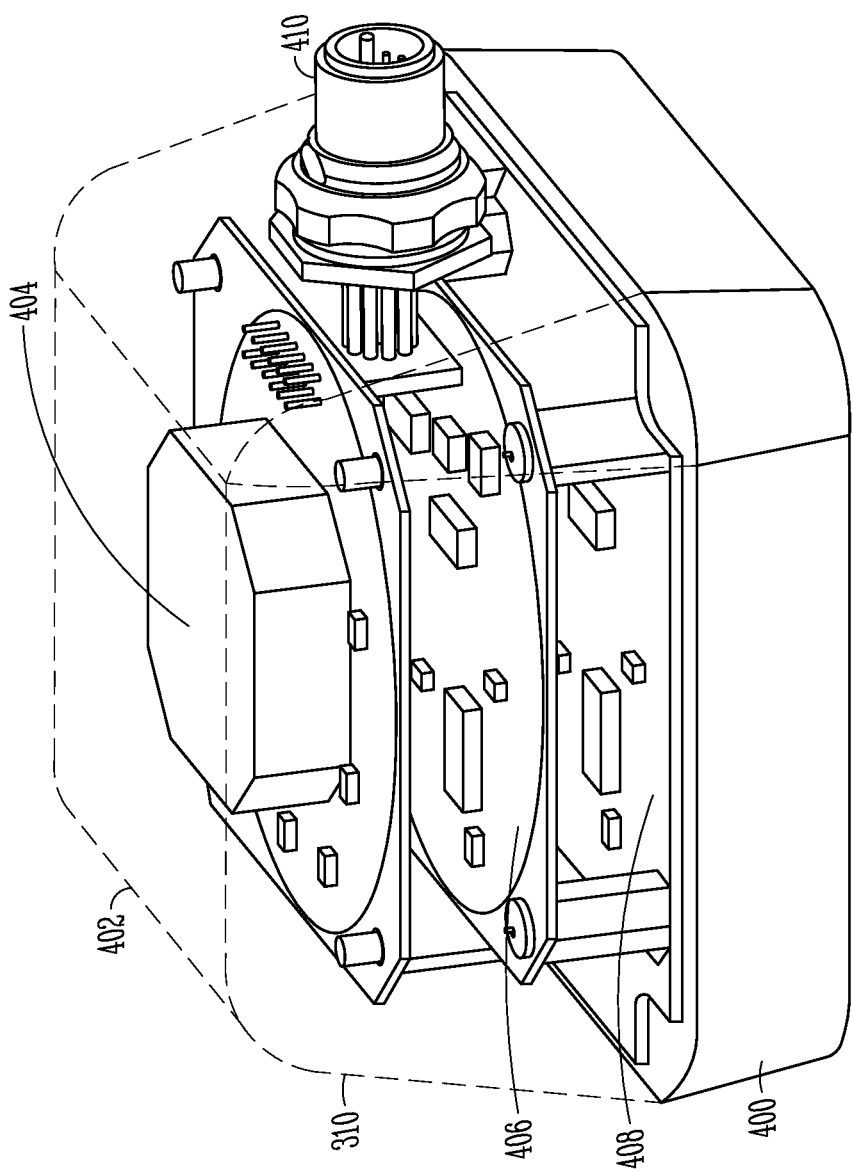
FIG. 4 is a perspective view of one example of a hardened enclosure housing components of the steering sensor system therein.

FIG. 4 shows one example of a hardened enclosure, such as the hardened enclosure 310 previously shown in FIGS. 3A and 3B. In the example shown in FIG. 4, the hardened enclosure 310 includes an enclosure cover 402 coupled with an enclosure base 400. The components of one or more of the transmitter 108 and the receiver 110 are positioned therein. As previously described, the steering position sensor assembly 106, for instance shown in FIGS. 1 and 2 and further shown in FIGS. 3A and 3B, provides the transmitter 108 and the receiver 110 in hardened enclosures without any sort of mechanical or electrical linkage extending across the steering linkage 202 therebetween. By providing the transmitter 108 and the receiver 110 in hardened enclosures the otherwise sensitive components therein are protected during operation (e.g., use of a vehicle in rough terrain, in a field, road driving and the like). Violent contact, for instance by debris such as rocks and dirt, interference of debris with sensitive components of the transmitter and receiver 108, 110 are thereby substantially prevented. Additionally without a mechanical or electrical interface between the transmitter and the receiver 108, 110 at the steering linkage, thrown debris, mud, dust, and the like cannot interfere with the operation of the steering position sensor assembly 106 because each of the transmitter and the receiver 108, 110 are physically separated from one another.

Referring again to FIG. 4, the hardened enclosure 310 is shown with the enclosure cover 402 in phantom lines surrounding an antenna module 404, an amplification module 406, and a bottom board 408. As described herein and further shown in FIG. 5, each of the antenna module 404, the amplification module 406 and the bottom board 408 are electrically coupled with one another and configured to provide one or more signals and receive one or more signals through the signal port 410. In one example, the antenna module 404 includes one or more of the coils such as the transmitting and receiving coils 302, 304, 306, 308 previously shown in FIGS. 3A and 3B. For instance, the antenna module 404 includes two coils and each of the coils are mounted at 90 degrees relative to one another (e.g., along a coil plane). In another example, the antenna module 404 includes a plurality of coils (two or more) arranged at a set interval relative to one another, for instance at 45 degree relative angles with four coils, 30 degree relative angles with six coils and the like. There is no constraint that the angles between multiple coils are uniform. For instance, a system of four or more coils could arrange two of the coils at 30 degrees relative to each other, a third coil at 35 degrees relative to one of the coils and a fourth coil at 56 degrees relative to one of the coils. Generally, any permutation of angle measures will work with the steering position sensor assembly 106 after appropriate alteration to the system (e.g., signal conditioning, mathematical analysis and the like).

In still another example, and as previously shown in FIG. 3A, each of the antenna modules 404 includes one or more coils, for instance the transmitter 108 includes two transmitting coils 302, 304 and the receiver 110 includes one or more of the first receiving coil 306 and the second receiving coil 308. Optionally, the receiver 110 includes two or more sensors, such as Hall Effect sensors, oriented in the same manner as the coils (e.g., 90, 45 or 30 degrees) in place of the coils.

The amplification module 406 shown between the antenna module 404 and the base band module 408 in FIG. 4 includes in another example one or more signal conditioning components configured to cooperate with the antenna module 404. For instance, the amplification module 406 associated with the transmitter 108 includes a digital shifter and driver configured to provide component excitation signals to each of the transmitting coils 302, 304 phase shifted a designated angle (e.g., 90 degrees) relative to one another.

The amplification module 406 associated with the receiver 110 in one example includes one or more amplification modules that cooperate with each of the first and second receiving coils 306, 308 to amplify the component reception signals generated by the coils. In another example the amplification module 406 of the receiver 110 includes a quadrature summing module configured to merge the component reception signals according to a specified phase shift, for instance 90 degrees, provided by a corresponding digital shifter associated with the amplification module 406 of the transmitter (e.g., to form the composite reception signal).

Referring again to FIG. 4, the bottom board 408 coupled with one or both of the antenna module 404 and the amplification module 406 includes other components of the transmitter 108, 110. In one example, the bottom board of the transmitter 108 includes, but is not limited to, having a digital divider configured to divide the excitation signal. The digital divider sends a first component of the excitation signal to the transmitting coil assembly 301 and sends another portion to the signal couplings such as the signal coupling 114 for use with the steering angle module 112 and a clock signal generator configured to coordinate the operation of the transmitter 108, the receiver 110 and the steering angle module 112.

Additionally, the bottom board 408 in another example includes the steering angle module 112. For instance, the steering angle module 112 shown separately in FIGS. 1 and 2 is incorporated in one of the transmitter or receiver enclosures 410. The bottom board 408 with the steering angle module 112 receives the reference signal generated by the transmitter 108 to compare the first phase value with the second phase value. Consolidating the components of the steering positioning sensor assembly 106, for instance into two components, facilitates installation and minimizes the need for extra wiring runs (e.g., to a separate steering angle module). Optionally, as shown in FIGS. 1 and 2, the steering angle module 112 is a separate component from the transmitter 108 and the receiver 110 and positioned at a different portion of the assembly base 102. As will be described in further detail below, in one example the steering angle module 112 includes or more phase detectors configured to determine the difference between the second phase value included in the reception signal from the receiver 110 and the first phase value provided in the excitation signal of the transmitter 108.

Figure 5:
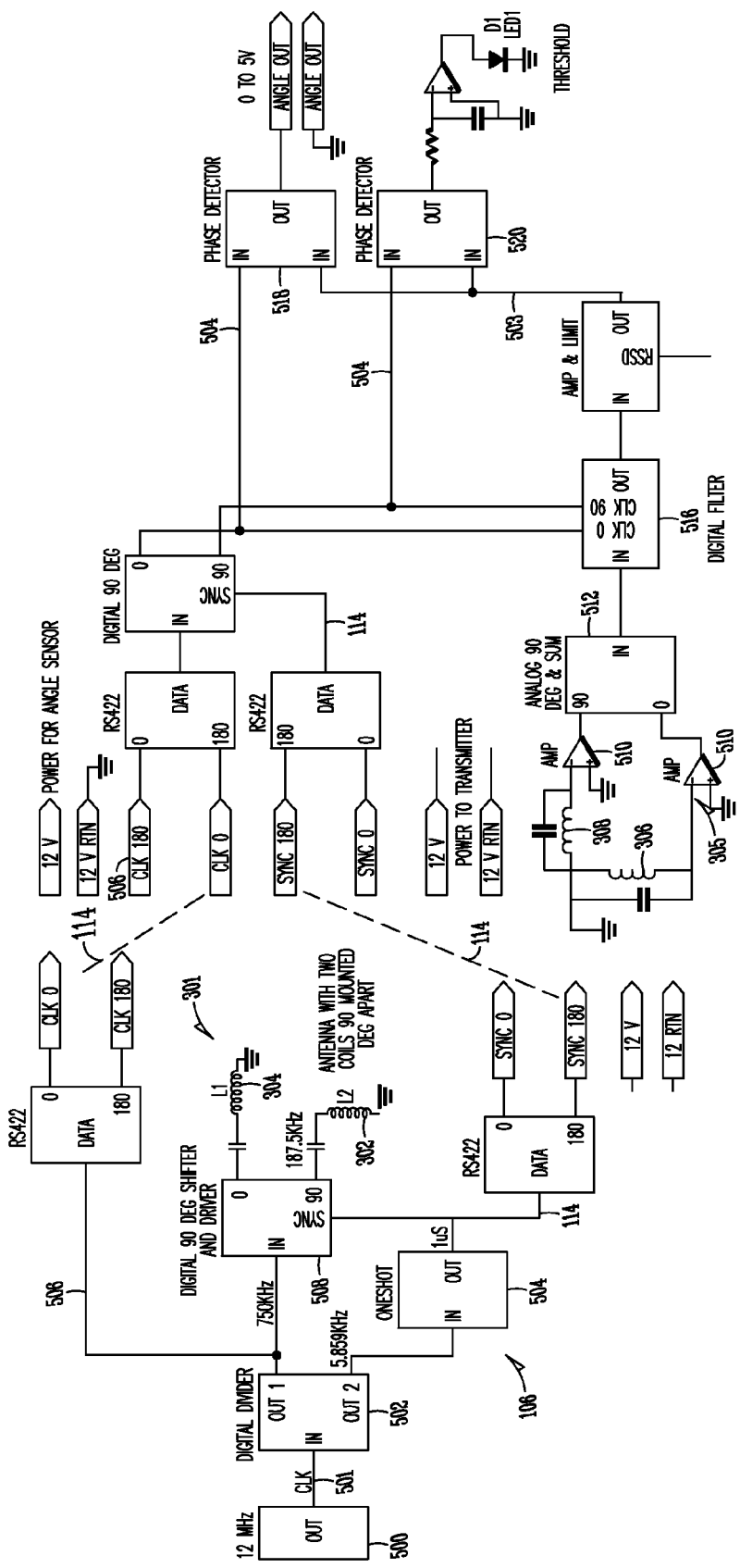
FIG. 5 is an electronic schematic of the steering sensor system shown in FIG. 3B.

FIG. 5 shows a schematic representation of the steering position sensor assembly 106. The schematic provided in FIG. 5 is simplified in at least some regards and focuses on the components of the assembly configured to generate and receive the magnetic fields and the corresponding excitation and reception signals. An excitation signal generator 500 is included in one example to generate the excitation signal having the first phase value. As previously described, the excitation signal is used by the transmitter 108 including, for instance, the transmitting closed assembly 301 to generate the corresponding magnetic field.

As shown in FIG. 5, the excitation signal provided by the generator 500 is split at a digital divider 502. In one example, the excitation signal is delivered as a reference signal 504 through the signal coupling 114. As shown, for instance, in FIG. 5 the signal coupling 114 extends to one or more phase detectors such as the phase detectors 518 and 520 described herein in detail below. The excitation signal is divided between a clock signal 506 component and another component delivered to a phase shifter and signal driver 508. As shown in FIG. 5, the clock signal 506 is delivered through the signal coupling 114 to a corresponding portion of the receiver 110. Optionally, the receiver 110 includes the steering angle module 112 therein having the phase detectors 518, 520.

Referring again to FIG. 5, the excitation signal is divided at the phase shifter and signal driver 508 into two or more components. As shown in the example, the excitation signal is divided into two signal components for each of the respective first and second transmitting coils 302, 304. The phase shifter and signal driver 508, in one example, generates two separate excitation signals having a net phase shift of 90 degrees. For instance, as shown in FIG. 5, the excitation signal for the first transmitting coil 302 has a relative phase shift from the second excitation signal for the second transmitting coil 304 of 90 degrees. In another example, each of the excitation signals have a net phase shift of approximately 90 degrees, for instance, the first excitation signal for the first transmitting coil 302 has a phase shift of approximately positive 45 degrees while the second excitation signal for the second transmitting coil 304 has a phase shift of approximately −45 degrees relative to the first excitation signal component.

As further shown in FIG. 5, the receiving coil assembly 305 includes the first and second receiving coils 306, 308. The first and second receiving coils 306, 308 are coupled with corresponding antenna amplifiers 510. The amplifiers 510 equally weight the component reception signals generated by each of the first and second receiving coils 306, 308. The corresponding reception signals are provided to a summer and phase shifter 512. For instance, in one example, the summer 512 and phase shifter include a quadrature summer configured to phase shift the two component reception signals 90 degrees (according to the original phase shifting at the phase shifter and signal driver 508) and sum the component signals (as the composite reception signal) for use by the phase detectors 518, 520 to measure the difference between the second phase value and the first phase value as previously described herein. In another example, the composite reception signal is filtered through a digital filter 516 as shown in FIG. 5. The resulting composite reception signal is thereafter delivered to the phase detector 518 and optionally the calibration phase detector 520.

As shown in FIG. 5, the phase detector 518 receives both the composite reception signal 503 and the reference signal 504. The phase detector 518 thereafter compares the composite reception signal 503 with the reference signal 504. By comparing the two signals the difference between the second phase value, for instance, from the composite reception signal 503, and the first phase value of the reference signal 504 is determined. The difference in phase corresponds to the rotational position of at least one of the components such as the steered component 104 or the assembly base 102 relative to the other component, for instance, the assembly base 102 or the steered component 104. As previously described herein, where each of the transmitting coil assembly 301 and the receiving coil assembly 305 includes two or more transmitting and receiving coils the phase detector 518 is correspondingly configured to determine the rotational position of each of the transmitting and receiving coil assemblies 301, 305 (including, for instance, the assembly base 102 and the steered component 104) relative to the other of the receiving and transmitting coil assemblies 301, 305.

In another example, the steering position sensor assembly 106 includes a calibration phase detector 520 as shown in FIG. 5. In one example, the calibration phase detector 520 includes a calibration threshold therein, for instance, a voltage value such as 2.5 volts. During calibration of the steering position sensor assembly 106 one or more of the steered component 104 or the assembly base 102 is rotated relative to the opposed component and the corresponding reception signal such as the reception signal 503 is delivered to the calibration phase detector 520. As the reception signal 503 meets the threshold value, for instance 2.5 volts, the calibration phase detector 520 indexes the corresponding reception signal as corresponding to, for instance, a center position of the steered component 104 where the steered component is on a relatively straight orientation relative to the assembly base 102. In one example, the calibrated value determined by the calibration phase detector 520 is thereafter used by a software module or a hard wired module associated with the phase detector 518 to correspondingly measure the angle of one or more of the steered component 104 or the assembly base 102 relative to the opposed component based on the measured difference in phase value from the reception signal 503 and the reference signal 504.

Figure 6:
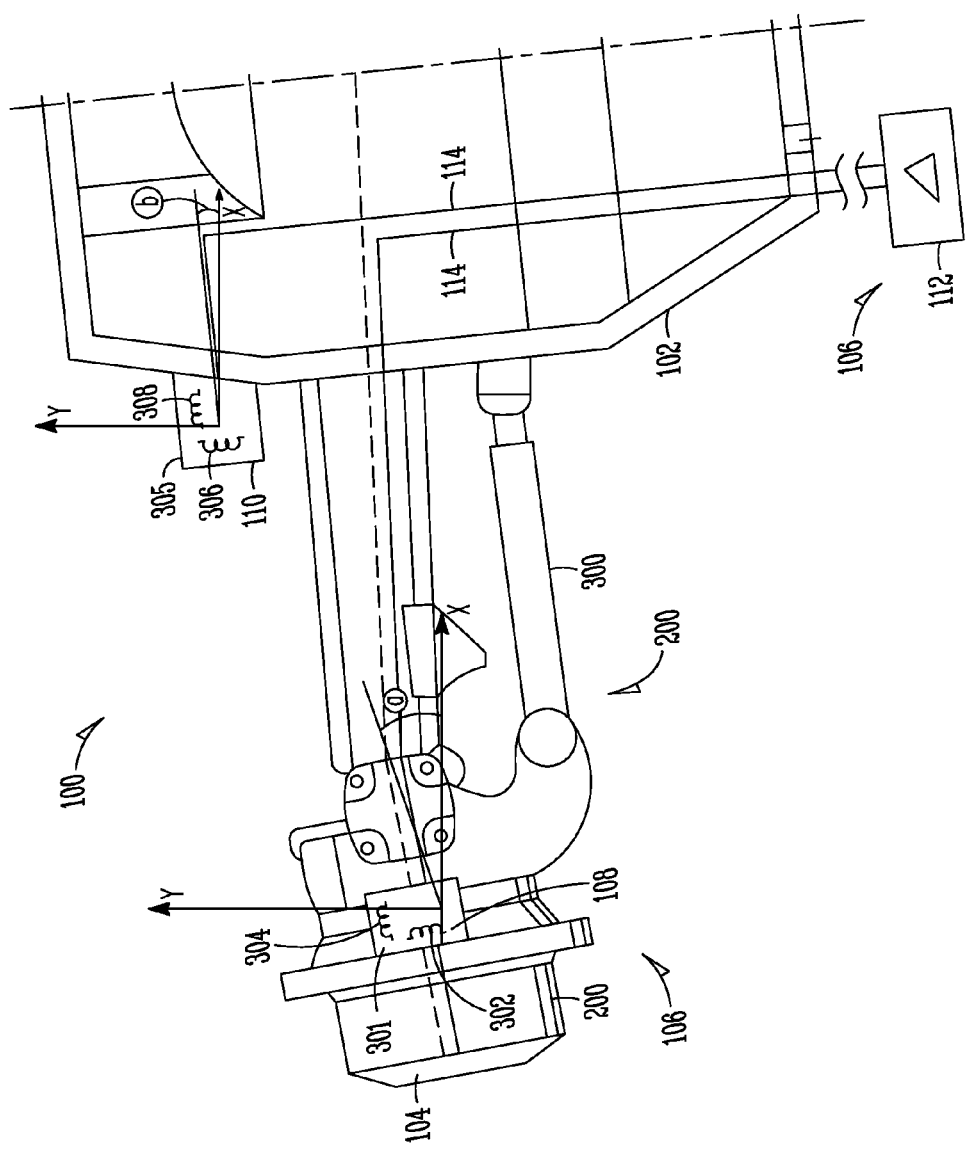
FIG. 6 is a schematic view of the steering sensor system shown in FIG. 3B with a steered component rotated relative to an assembly base.

FIG. 6 shows a portion of the vehicle 100 in a rotated and steered configuration relative to the position shown in FIGS. 3A and 3B. For instance, the assembly base 102 is steered or rotated relative to the assembly base 102 shown in FIG. 3A by an angle of approximately "b" shown in FIG. 6 relative to an X axis. Similarly, the steered component 104 is rotated relative to the steered component 104 in FIG. 3A an angle "a" shown in FIG. 6 relative to an X axis. As shown in FIG. 6, the X and Y axes of the respective transmitter 108 and receiver 110 are substantially parallel with each other. Accordingly the corresponding rotation angles a and b are measured with regard to the parallel X axes.

In operation, the steering position sensor assembly 106 with the transmitter and receiver 108, 110 as described herein is able to determine one or more of the rotated position of the steered component 104 and the assembly base 102. That is to say, the steering position sensor assembly 106 is a rotational position sensor. For instance, as shown in FIG. 6 the transmitter 108 and the receiver 110 each include the respective transmitting and receiving coil assembly 301, 305. As previously described, where each of the transmitting and receiving coil assemblies 301, 305 include two or more transmitting and receiving coils 302, 304 and 306, 308 respectively the rotation of each of the opposed components 102, 104 is measurable relative to the other opposed component 104, 102. Furthermore, where one of the transmitter or the receiver 108, 110 includes two coils and the other of the receiver and the transmitter 110, 108 includes a single coil the component including the two coils is suitable for measurement as the rotated component of the steering position sensor assembly 106 as described herein.

Referring now to FIG. 6, as previously described, the steered component 104 is rotated an angle a as shown in FIG. 6. Similarly, the assembly base 102 is rotated an angle b relative to the X axis. As previously shown in FIG. 5, an excitation signal generator 500 generates an excitation signal 501 having a first phase value. The excitation signal is delivered through, in one example, a phase shifter and signal driver 508 as shown in FIG. 5 to the first and second transmitting coils 302, 304. Each of the first and second transmitting coils 302, 304 generates component magnetic fields, for instance, sinusoidal time varying dipole near fields that are out of phase with relative to one another, for instance, 90 degrees phase shifted. The component magnetic near-fields when combined form a composite magnetic near-field that is a rotating magnetic near field that increases its rotation angle according to the first phase value of the excitation signal 501. That is to say, the component excitation signals delivered to each of the first and second transmitting coils 302, 304 cooperate to provide a composite rotating magnetic near field that has a rotation angle corresponding to the first phase value of the excitation signal.

The receiving coil assembly 305 (shown in FIG. 6) including, for instance, the first and second receiving coils 306, 308, senses the rotating magnetic near field of the transmitter 108. The receiving coil assembly 305 generates a corresponding reception signal having a second phase value that varies according to the rotation of at least one of the transmitting or receiving coil assemblies 301, 305 (including relative rotation of the magnetic near-field) relative to the opposed receiving or transmitting coil assembly. Stated another way, the rotating magnetic near-field, for instance, the composite magnetic near-field generated by the transmitter 108 as rotated and sensed at the receiving coil assembly 305 is used to inductively generate the reception signal such as the reception signal 503 shown in FIG. 5 having the second phase value based on the rotation of one or more of the transmitting or receiving coil assemblies 301, 305. For instance, as shown in FIG. 5, each of the first and second receiving coils 306, 308 generates component reception signals based on the magnetic near field that are delivered through separate antenna amplifiers to equally weight the component reception signals before reaching a summer and phase shifter 512 (e.g., a quadrature summer). The summer and phase shifter 512 shifts the component reception signals prior to summing of the reception signals and delivery as the composite reception signal 503 to one or both of the phase detectors 518, 520 shown in FIG. 5.

The reception signal 503 delivered to the phase detectors 518, 520 includes a second phase value based on rotation of one or more of the transmitting or receiving coil assemblies 301, 305. For instance, as shown in FIG. 6, the second phase value of the reception signal is based on the rotation of one or both of the steered component 104 and the assembly base 102 corresponding to one or both of the angles a and b as shown in FIG. 6. In one example, the steering angle module 112 including, for instance, one or both of the phase detectors 518, 520 compares the second phase value included in the reception signal with the first phase value of the excitation signal 501. As previously described and shown in FIG. 5, in one example, the excitation signal is delivered as a reference signal 504 along the signal coupling 114 to the steering angle module 112. The steering angle module uses the reference signal 504 (e.g., the excitation signal with the first phase value) as a reference to determine the difference between the second phase value of the reception signal 503 and the first phase value of the excitation signal 501. The difference between the second and first phase values corresponds to the rotational position of one or more of the steered component 104 relative to the assembly base 102 or the assembly base 102 relative to the steered component 104.

With the above described operation, the steering position sensor assembly 106 is thereby able to determine the rotated position (e.g., steering angle) of one or more of the components including the steered component 104 and the assembly base 102 relative to the opposed component of the assembly base or the steered component. The steering position sensor assembly 106 is able to determine the rotated position of one or both of these components relative to the other component without requiring a mechanical or electrical linkage between the steered components that would otherwise be subject to debris, violent contact from rocks, stone, sticks and the like when the vehicle 100 is used, for instance in the field, off road, in a combat environment and the like. Instead, a signal coupling such as the signal coupling 114 is provided between the transmitter 108 and the receiver 110, and in one example a steering angle module 112, to deliver a reference signal as well as other information between the transmitter 108 and the receiver 110 to thereby facilitate the determination of the steering angle of one or more of the components.

Expensive and repair intensive components such as mechanical linkages, electrical linkages and the like between separate components of a steering position sensor assembly coupled across the steering linkage 202 are thereby substantially avoided. Instead, the steering position sensor assembly 106 as provided herein is able to accurately and reliably determine the rotational position of one or more components relative to other components in the system through the use of magnetic near-fields. The magnetic near-fields facilitate the use of the system without the use of other long range position sensing methods, such as radio direction finding. As previously described herein, radio direction finding operates according to different principles, for instance at much higher frequencies that require greater distance between the components, and is accordingly not applicable for a steering position sensor assembly 106 coupled between the steered component 104 and the assembly base 102 where these components are substantially adjacent to one another (e.g., wherein the components are around 2 meters or less from each other respectively).

As described herein and shown in FIG. 6, in one example, the steering angle module 112 is shown as a component separate from each of the transmitter 108 and the receiver 110. In another example, for instance to consolidate multiple components into as few components as possible, the steering angle module 112 including the phase detector 518 and the calibration phase detector 520 is instead consolidated with one or more of the transmitter 108 and the receiver 110. For instance, the signal coupling 114 is directly coupled between each of the transmitter 108 and the receiver 110 thereby eliminating the need for a separate steering angle module 112. Instead the phase detector 518 and the calibration phase detector 520 are incorporated into one or more of the hardened enclosures 310 shown, for instance, in FIG. 3 (and further described and shown in FIG. 4) for the receiver and the transmitter 108, 110.

Figure 7:
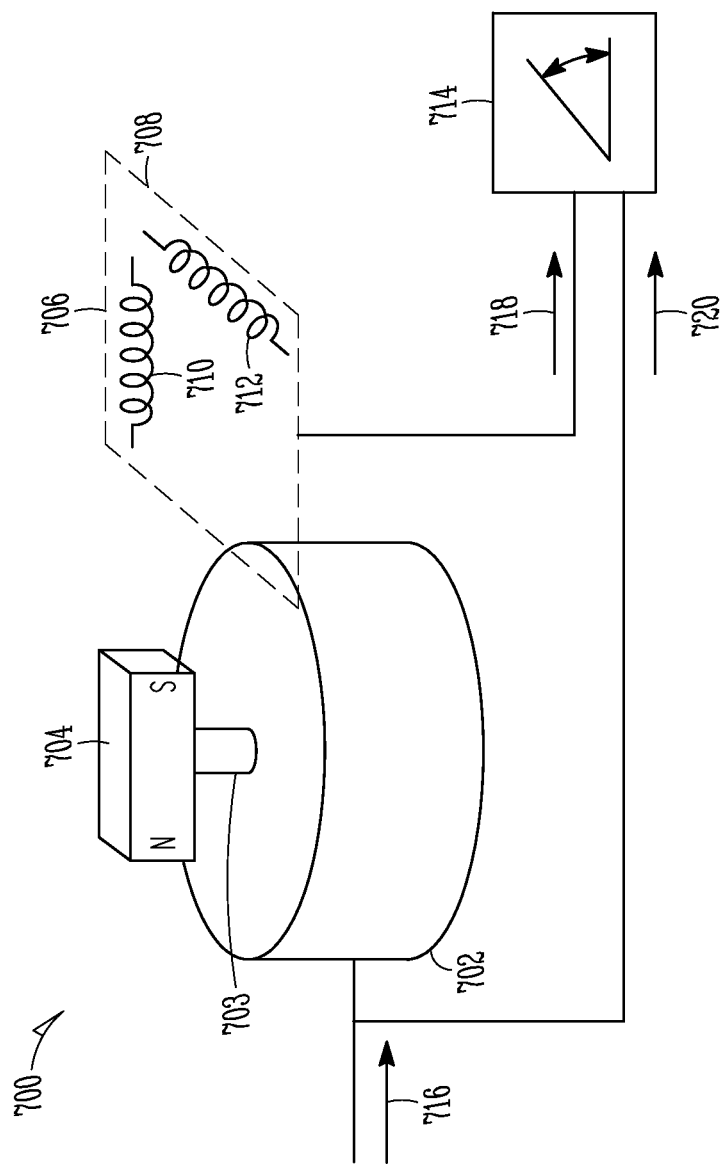
FIG. 7 is a schematic view of another example of a position sensor assembly configured to sense the rotational position of a rotating shaft.

FIG. 7 shows another example of a rotation position sensor assembly 700. As described herein, rotation position sensor assemblies and steering position sensor assemblies encompass identical subject matter including the assemblies described herein configured to detect and measure the rotational angle of one component relative to another. As shown in FIG. 7, the rotation position sensor assembly 700 is coupled with a motor 702. In one example, the motor 702 includes but is not limited to an electric motor such as a stepper motor, a synchronous motor, and the like that predictably rotates a shaft according to the excitation signal provided. A shaft 703 extends from the motor 702 (e.g., coupled with a rotor) to a transmitter 704. In the example shown in FIG. 7, the transmitter 704 includes but is not limited to a bar magnet fixedly coupled with the shaft 703. Rotation of the shaft 703 correspondingly rotates the transmitter 704. Optionally, the transmitter 704 includes any of the transmitting coil assemblies described herein (having one or more transmitting coils).

As further shown in FIG. 7, a receiver 706 is provided adjacent to the motor 702 and the transmitter 704. In one example, the receiver 706 includes a receiving coil assembly, such as the receiving coil assembly previously described herein. For instance, the receiver 706 includes a first receiving coil 710 and an optional second receiving coil 712. As shown in FIG. 7, in one example, the first and second receiving coils 710, 712 are housed within a hardened enclosure 708 similar to the enclosure previously described herein and shown in FIG. 4. As further shown in FIG. 7, the receiver 706 is electrically coupled with a phase detector 714. As will be described in further detail below, the phase detector 714 is configured to measure the rotation of the shaft 703 coupled with the motor 702. The phase detector 714 is thereby able to detect and measure the rotational position, speed and the like of the motor 702. In one example, the detected rotation angle or speed of the motor 702 is used for a variety of control functions, for instance, control of the motor 702 or other components coupled with the motor.

As shown in FIG. 7, an excitation signal 716 including a time varying sinusoidal signal having a first phase value is provided to the motor 702. In one example, the excitation signal 716 is used to drive the motor 702, for instance, at a desired speed, torque or the like. As with the previous steering position sensor assembly 106, the excitation signal 716 includes a first phase value. As shown in FIG. 7, a reference signal 720, for instance, corresponding to the excitation signal 716 is transmitted to the phase detector 714 for use by the phase detector in measuring the rotation position of the shaft 703 and the transmitter 704. As further shown in FIG. 7, the reception signal 718 generated by the receiver 706 is transmitted to the phase detector 714. In a similar manner to the previously described steering position sensor assembly 106 the reception signal 718 includes a second phase value varied according to the rotational position of the transmitter 704 (for instance, a bar magnet) relative to the receiver 706.

In operation, a reference signal 720 corresponding to the excitation signal 716 is transmitted to the phase detector 714. In one example, the reference signal 720 is identical to the excitation signal 716, for instance, the reference signal 720 is split from the excitation signal and delivered along a signal coupling as with the previously described steering position sensor assembly 106. The motor 702 rotates the shaft 703 and the transmitter 704 generates a magnetic dipole near field. The magnetic dipole near field is sensed by the receiver 706 including, for instance, one or more of the first and second receiving coils 710, 712. The first and second receiving coils 710, 712 generate component reception signals based on the rotating magnetic near field, and upon proper conditioning (described herein previously) the component reception signals are delivered as a reception signal 718 to the phase detector 714.

The reception signal 718 has a second phase value varying according to the rotation of the transmitter 704 relative to the receiver 706. The second phase value of the reception signal 718 is compared with the first phase value of the reference signal 720 by the phase detector 714. The phase detector 714 is thereby able to determine the rotational position (e.g., angle) of the shaft 703 and the transmitter 704 relative to the receiver 706. With interpretation of the rotational position of the transmitter 704 the phase detector 714, for instance with a speed determination module, is able to also determine the rotational speed of the shaft 703 (and the rotor) of the motor 702.

In one example, the rotation position sensor assembly 700 shown in FIG. 7 includes a single receiving coil such as the first or second receiving coil 710, 712. Because the transmitter 704 is configured to generate a magnetic dipole near field the receiver 706 including a single receiving coil is readily able to detect the rotational position of the transmitter 704 relative to the receiver 706. With such a single coil configuration the phase detector 714 is able to determine the rotational position of the shaft 703 and the transmitter 704 relative to the receiver 706.

Figure 8:
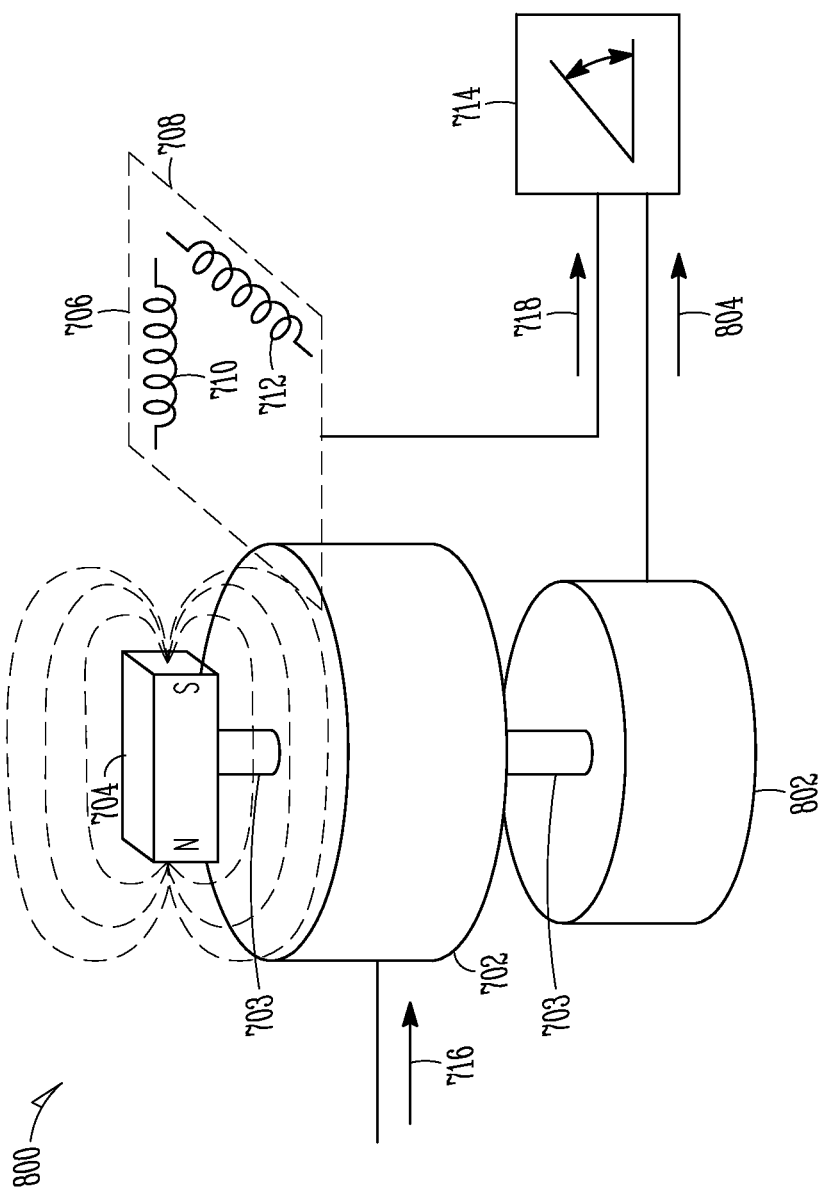
FIG. 8 is a schematic view of yet another example of a position sensor assembly configured to sense the rotational position of a rotating shaft.

FIG. 8 shows another example of a rotation position sensor assembly 800. In at least some regards, the rotation position sensor assembly 800 includes similar components to the rotation position sensor assembly 700 shown in FIG. 7 (as well as the steering positioning sensor assembly 106). For instance, the rotation position sensor assembly 800 includes a motor 702, a transmitter 704, a receiver 706 and a phase detector 714. In addition to these components, the rotation position sensor assembly 800 includes an encoder 802 (e.g., an optical shaft encoder, alternator or the like). As shown in FIG. 8, the encoder 802 is configured to rotate based on rotation of the shaft 703 extending to the transmitter 704. That is to say, with rotation provided by the motor 702 the encoder 802 and the transmitter 704 rotate at the same speed and rotate the same degree measure.

As previously described, the rotation position sensor assembly 800 shown in FIG. 8 includes an encoder 802. In one example, where the encoder 802 includes an alternator the alternator generates a time varying sinusoidal wave including a phase value therein. In one example, the phase value therein corresponds to a first phase value as previously described and is used in a reference signal 804, for instance, with the phase detector 714. In another example, the encoder includes an optical encoder configured to generate one or more voltage pulses with every revolution of the shaft 703. The pulses generated by such an encoder 802 correspondingly provide phase information, such as a first phase value in the reference signal 804 provided to the phase detector 714. In whatever form the encoder 802 takes a references signal 804 including the first phase value information is provided to the phase detector 714.

With rotation of the transmitter 704, for instance, according to rotation of the motor 702, both the alternator 802 and the transmitter 704 are rotated at the same speed. The receiver 706 detects the magnetic dipole near field of the transmitter 704 and accordingly generates a reception signal 718 having the second phase value as previously described herein. The phase detector 714 compares the second phase value of the reception signal 718 with the first phase value of the reference signal 804 and determines the phase difference between the two phase values. The phase difference between these phase values corresponds to the rotational position of the transmitter 704, the shaft 703 and the encoder 802 relative to the receiver 706. Stated another way, the system shown in FIG. 8 is configured to detect the rotational position of the electric motor 702. The rotation position sensor assembly 800 is able to measure the difference in phase by using a reference signal 804 generated not according to an excitation signal, for instance, the excitation signal applied to the motor 702 but by a reference signal 804 generated by an encoder 802 coupled with the motor 702. The reference signal 804 includes the first phase value and the phase detector 714 uses the first phase value in the comparison with the second phase value of the reception signal 718 to determine the rotational position of the transmitter 704 and the shaft 703.

Figure 9:
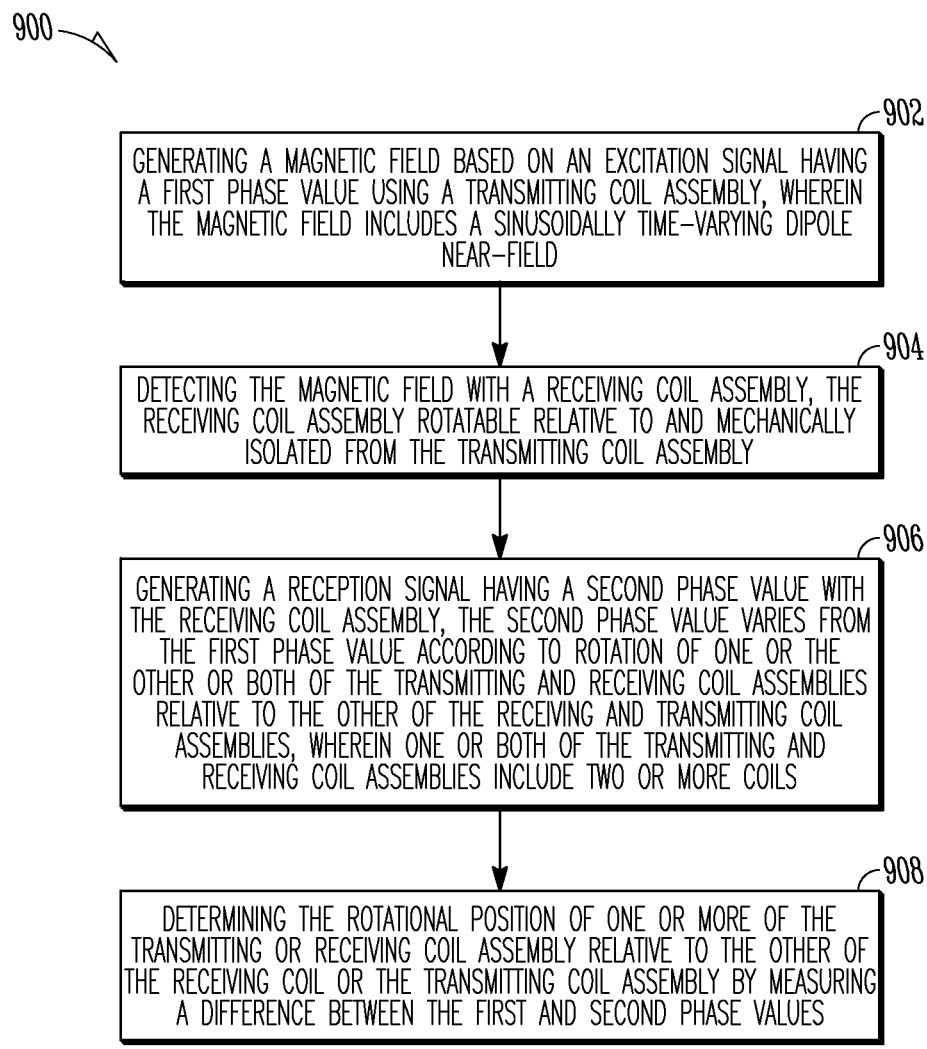
FIG. 9 is a block diagram showing one example of a method for using a steering position sensor.

FIG. 9 shows a block diagram illustrating one example of a method 900 for using a rotational position sensor such as the position sensor assemblies 106, 700, 800 previously described herein. In describing the method 900, reference is made to features and elements previously described herein including numbered references where convenient. Numbered elements provided within the description of the method 900 are not intended to be limiting. Instead, numbered references are provided for convenience and further include any similar features described herein, for instance, for the assemblies 700 and 800, as well as their equivalents.

At 902, a magnetic field based on an excitation signal having a first phase value is generated using a transmitting coiling assembly. The magnetic field includes a sinusoidally time varying dipole near field. At 904, the magnetic field is detected with a receiving coil assembly 305. The receiving coil assembly 305 is rotatable relative to and mechanically isolated from the transmitting coil assembly 301. For instance, as previously described herein, the transmitting coil assembly 301 is in one example coupled with a rotating feature such as a steering knuckle 200 and the receiving coil assembly 305 is coupled with an assembly base 102 of the vehicle 100. Optionally, either of the transmitting coil assembly 301 or the receiving coil assembly 305 are coupled with opposing features, for instance, the receiving coil assembly 305 is coupled with the steered component, such as the steering knuckle 200, and the transmitting coil assembly 301 is coupled with the assembly base, such as a vehicle body of the vehicle 100. In still another example, the transmitting coil assembly 301 and the receiving coil assembly 305 are coupled with opposing components of a rotatable system such as a motor having a motor housing including a stator and a rotor (see FIGS. 7 and 8).

At 906, the method 900 includes generating a reception signal 503 having a second phase value with the receiving coil assembly 305. The second phase value of the reception signal 503 varies from the first phase value according to rotation of one or the other or both of the transmitting and receiving coil assemblies 301, 305 relative to the other of the receiving and transmitting coil assemblies. One or both of the transmitting and receiving coil assemblies 301, 305 includes two or more coils as previously described herein (or optionally a permanent magnet, Hall Effect sensors or the like). At 908, the rotational position of one or more of the transmitting or receiving coil assembly 301, 305 relative to the other of the receiving coil or the transmitting coil assembly is determined by measuring a difference between the first and second phase values.

As previously described above, a reception signal 503 is generated and the reception signal includes a second phase value. The reception signal is generated in one example by the receiving coil assembly 305. The reception signal having the second phase value in combination with the first phase value of the excitation signal 501 (e.g., a reference signal 504) allows for the determination of the rotational position of one or both of the transmitting or receiving coil assemblies as described herein. In one example, where the transmitting coil assembly 301 includes two or more transmitting coils 302, 304 generating the magnetic field includes generating respective magnetic field components with each of the transmitting coils 302, 304. The magnetic field component generated by each of the transmitting coils 302, 304 has an amplitude and phase shift relative to the other magnetic field components (e.g., a phase shift with a two coil assembly of 90 degrees in one example) such that the composite magnetic field is a rotating magnetic dipole near field with a rotation angle that increases directly according to the first phase value of the excitation signal.

Where the receiving coil assembly 305 includes two or more receiving coils generating the reception signal 503 includes generating component reception signals with each of the receiving coils 306, 308. Each of the component reception signals is weighted and phase shifted, for instance, with a summer and phase shifter 512 shown in FIG. 5, such that the reception signal 503 is the same as the reception signal generated by two virtual receiving coils the axis of which are 90 degrees apart. The reception signal 503 is the equally weighted sum of respective component reception signals generated by each of the two virtual receiving coils. The two component signals are phase shifted approximately 90 degrees relative to each other before summing Stated another way, with any receiving coiling assembly having two or more receiving coils 306, 308 (or two receiving coils at non-right angles) an adjustment is made to the analysis of the component reception signals that provides a convention that converts the two or more component reception signals into virtually two component reception signals that are 90 degree phase shifted relative to each other. The summer and phase shifter 512 thereafter combines the two virtual component signals into a single reception signal 503 as shown in FIG. 5. An example of such a conversion is provided herein (above) with the mathematical analysis of the prophetic example of a virtual coil system.

As previously described herein, the method 900 facilitates the detection of the steering angle or rotational position of one component relative to another (or both components relative to each other) according to magnetic near fields generated by a transmitter 108 including one or more of transmitting coils 302, 304, a permanent magnet 704 or the like. In a similar manner, the magnetic near field is sensed by a receiver 110 including a coil assembly 305 including one or more receiving coils 306, 308 or another type of sensor including, for instance, one or more Hall Effect sensors. The receiver 110 including the sensors (e.g., coils or Hall Effect sensors) is positioned substantially adjacent to the transmitter 108 (see FIGS. 6, 7 and 8 and the assemblies 106, 700, 800). The assemblies 106, 700, 800 use magnetic near fields, as opposed to radio-frequency signals, to provide rotational position determination with components that are close to one another, for instance within about two meters. Radio direction finding does not work at such a close range.

Several options for the method 900 follow. In one example, rotating one of the transmitting and receiving coil assembly 301, 305 relative to the other coil assembly includes at least one of the transmitting and receiving coil assembly having two or more coils 302, 304 or 306, 308. The coils are parallel to a coil plane (see, for instance, FIGS. 3A, 3B and 6) and the coils of at least one of the transmitting and receiving coil assemblies 301, 305 rotate parallel to the coil plane during operation. In another example, both of the transmitting and receiving coil assemblies 301, 305 each include two or more coils 302, 304 and 306, 308. Determining the rotational position of one or more of the transmitting or receiving coil assemblies 301, 305 includes both determining the rotational position of the transmitting coil assembly relative to the receiving coil assembly and determining the rotational position of the receiving coil assembly relative to the transmitting coil assembly. Stated another way, both of the rotational positions of the transmitting and receiving coil assemblies 301, 305 are detectable and measurable with each of the transmitter and the receiver 108, 110 having two or more coils (or an equivalent, such as a dipole magnet, dual Hall Effect sensors and the like).

In another example, the method 900 includes generating magnetic field components with first and second transmitting coils 302, 304 oriented at a right angle relative to each other. In still another example, detecting the magnetic fields includes detecting the magnetic field with first and second receiving coils 306, 308 oriented at a right angle relative to each other (FIGS. 3B and 6). In still another example, measuring the difference between the first and second phase values includes measuring the difference with the phase detector 518, for instance, incorporated into a steering angle module 112 (a rotation angle module). The phase detector 518 is electrically coupled between the transmitting and receiving coil assemblies 301 and 305. In another example, the method 900 includes transmitting a reference signal 504 to the phase detector 518. The reference signal 504 corresponds to the excitation signal 501 having the first phase value. In another example, the method 900 further includes transmitting the reception signal 503 with the second phase value from the receiving coil assembly 305 to the phase detector 518.

As discussed herein, the steering position sensor assembly 106 includes a transmitter 108 and a receiver 110 each having one or more coils configured to generate or sense a magnetic field that is a sinusoidally time varying near field. The magnetic near field includes circumferential and radial field components (as opposed to the circumferential components of radio signals). One example of a mathematical analysis of a magnetic near field generated by a transmitter (whether transmitter coils, permanent magnet or the like) and sensed by a receiver (whether receiver coils, Hall Effect sensors or the like) is provided below. The mathematical analysis is a prophetic example. Changes to the assembly, for instance a differing number of coils, magnets or Hall Effect sensors; differences in initial phase shifting; and differences in angular position of the coils, will alter the analysis in a predictable manner and are captured within the umbrella of the prophetic example provided below.

As described above, each of the transmitter coils 302, 304 generates a sinusoidally time-varying magnetic field which is a close approximation to a dipole field. The dipole fields generated by the two transmitter coils are shifted by 90 degrees in phase relative to each other, for instance by a phase shifter 508. As described herein, the sinusoidally time-varying magnetic field is also generated in an example by another component, such as a dipole magnet.

A monopole field at the origin is proportional to:

$$M_x = ((x^2+y^2)^{-1.5}) \cdot x \tag{1a}$$

$$M_y = ((x^2+y^2)^{-1.5}) \cdot y \tag{1b}$$

A slight displacement 'p' from the origin in the direction a counterclockwise from the x axis modifies the monopole field to:

$$M_x = ((x-p\cos(a))^2+(y-p\sin(a))^2)^{-1.5} \cdot (x-p\cos(a)) \tag{2a}$$

$$M_y = ((x-p\cos(a))^2+(y-p\sin(a))^2)^{-1.5} \cdot (y-p\sin(a)) \tag{2b}$$

A dipole field whose axis is in the direction 'a' counterclockwise from the x axis can be computed at a point on the x axis by differentiating the monopole field with respect to p, then setting p and y to zero:

$$D_x = dM_x/dp = 2\cos(a) \cdot x^{-3} \tag{3a}$$

$$D_y = dM_y/dp = -\sin(a) \cdot x^{-3} \tag{3b}$$

The superposition of two such fields, one varying as $\cos(\omega t)$ at angle a and the other varying as $\sin g(\omega t)$ at angle $a+\pi/2$ is proportional to:

$$D_x = 2(\cos(a) \cdot \cos(\omega t) - \sin(a) \cdot \sin(\omega t)) = 2\cos(a+\omega t) \tag{4a}$$

$$D_y = -\sin(a) \cdot \cos(\omega t) - \cos(a) \cdot \sin(\omega t) = -\sin(a+\omega t) \tag{4b}$$

The radial field is twice as strong as the circumferential field. If the field is sensed by a receiver coil whose axis is in the direction 'b' counterclockwise from the x axis, the coil sees:

$$S = 2\cos(a+\omega t) \cdot \cos(b) - \sin(a+\omega t) \cdot \sin(b) \tag{5}$$

The sum of the fields sensed by two such receiver coils, one at angle b and the other at angle $b+\pi/2$, with the second sensed field advanced by $\pm\pi/2$ in time relative to the first, is $$S = 2\cos(a+\omega t)\cdot\cos(b) - \sin(a+\omega t)\cdot\sin(b) + 2\cos(a+\omega t\pm\pi/2)\cdot\cos(b+\pi/2) - \sin(a+\omega t\pm\pi/2)\cdot\sin(b+\pi/2) = (2\pm 1)\cdot\cos(a+b+\omega t) \tag{6}$$

The receiver 110 works with either polarity of relative phase shift, but produces a signal 3 times stronger (9.5 decibels) one way compared to the other. The stronger signal is used where a stronger signal is desired.

The phase of the reception signal 503, relative to that of the transmitted signal (e.g., the excitation signal 501), varies directly with the rotation of either the transmitter 108 or the receiver 110, by angle a or b, respectively (See FIG. 6). A phase detector 518 interprets the angle of the particular coil assembly that is of interest as the detected phase angle. The arrangement with two or more coils at the transmitter 108 (or a magnet as described herein in FIGS. 7 and 8) and two or more coils at the receiver 110 (or dual Hall Effect sensors) allows either module to be mounted in either position on the body of the vehicle or on the steering knuckle with the rotation of one or both of the transmitter or the receiver readily measured relative to the opposing component.

As described herein, the steering position sensor assembly (106, 700, 800) is modified in one example by omitting one of the coils (or Hall Effect sensors) from one of the assemblies. If the assembly is modified by using only one coil in the receiver, then the received signal is that of equation (5). In that case, while the phase of the received signal (e.g., the second phase value) depends on both a and b, it varies linearly only with a. Therefore the receiver is not well suited to being the rotating member (e.g., the steered component 104).

If the invention is modified by using only one coil in the transmitter, then it follows from equations (3) that a similar restriction applies to the transmitter, which therefore is not well suited to being the rotating member. For instance, the single coil transmitter should be coupled with the assembly base 102.

Various Notes & Examples

Example 1 can include subject matter (such as an apparatus, a method, a means for performing acts, or a machine readable medium including instructions that, when performed by the machine, that can cause the machine to perform acts), such as a rotational position sensor comprising: a transmitting coil assembly configured to generate a magnetic field based on an excitation signal having a first phase value, wherein the magnetic field is a sinusoidally time-varying dipole near-field; a receiving coil assembly configured to detect the magnetic field generated by the transmitting coil assembly and to generate a reception signal having a second phase value varying from the first phase value according to rotation of one or the other or both of the transmitting and receiving coil assemblies relative to the other of the receiving and transmitting coil assemblies, respectively; wherein at least one of the transmitting and receiving coil assemblies includes two or more transmitting or receiving coils, respectively: where the transmitting coil assembly includes two or more transmitting coils, the magnetic field generated by the transmitting coil assembly includes respective magnetic field components generated by each of the transmitting coils, and the magnetic field component generated by each of the transmitting coils has an amplitude and phase shift relative to the other magnetic field components such that the magnetic field is a rotating magnetic dipole near-field whose rotation angle increases directly as the first phase value, and where the receiving coil assembly includes two or more receiving coils, the reception signal includes component reception signals generated by each of the receiving coils, and each of the component reception signals is weighted and phase-shifted such that the reception signal is the same as the reception signal generated by two virtual receiving coils the axes of which are 90 degrees apart, and the reception signal is the equally weighted sum of respective component reception signals generated by each of the two virtual receiving coils, the two component signals being phase-shifted 90 degrees relative to each other before summing; and a phase detector coupled with the transmitting and receiving coil assemblies and configured to measure a difference between the first and second phase values, and determine one or more of the rotational position of the transmitting coil assembly relative to the receiving coil assembly or the rotational position of the receiving coil assembly relative to the transmitting coil assembly based on the difference in phase value.

Example 2 can include, or can optionally be combined with the subject matter of Example 1, to optionally include wherein the two or more transmitting coils include first and second transmitting coils at right angles relative to each other.

Example 3 can include, or can optionally be combined with the subject matter of one or any combination of Examples 1 or 2 to optionally include wherein the transmitting and receiving coils are parallel to a coil plane, and at least one of the transmitting and receiving coils are rotatable parallel to the coil plane.

Example 4 can include, or can optionally be combined with the subject matter of one or any combination of Examples 1-3 to optionally include wherein the second phase value of the reception signal directly varies according to rotation of the transmitting coil assembly.

Example 5 can include, or can optionally be combined with the subject matter of one or any combination of Examples 1-4 to optionally include wherein the phase detector is electrically coupled with the transmitting and receiving coil assemblies with a signal coupling, and the transmitting coil assembly is configured to transmit a reference signal based on the excitation signal with the first phase value through the signal coupling.

Example 6 can include, or can optionally be combined with the subject matter of Examples 1-5 to optionally include wherein the receiving coil assembly is configured to transmit the reception signal through the signal coupling.

Example 7 can include, or can optionally be combined with the subject matter of Examples 1-6 to optionally include wherein the receiving coil assembly including two or more receiving coils includes first and second receiving coils, and the first and second receiving coils are at right angles relative to each other.

Example 8 can include, or can optionally be combined with the subject matter of Examples 1-7 to optionally include wherein the receiving coil assembly is configured to generate the reception signal having the second phase value varying from the first phase value according to rotation of the receiving coil assembly.

Example 9 can include, or can optionally be combined with the subject matter of Examples 1-8 to optionally include wherein the transmitting coil assembly including two or more transmitting coils includes first and second transmitting coils, and the first and second transmitting coils are at right angles relative to each other.

Example 10 can include, or can optionally be combined with the subject matter of Examples 1-9 to optionally include wherein the receiving coil assembly is configured to generate the reception signal having the second phase value varying from the first phase value according to rotation of the transmitting coil assembly.

Example 11 can include, or can optionally be combined with the subject matter of Examples 1-10 to optionally include wherein the transmitting and receiving coil assemblies are only coupled through the electrical coupling and the magnetic dipole field.

Example 12 can include, or can optionally be combined with the subject matter of Examples 1-11 to optionally include wherein the transmitting coil assembly includes first and second transmitting coils and the receiving coil assembly includes first and second receiving coils, and the receiving coil assembly is configured to generate the reception signal having the second phase value varying from the first phase value according to rotation of one or both of the transmitting or receiving coil assemblies.

Example 13 can include, or can optionally be combined with the subject matter of Examples 1-12 to include, subject matter (such as an apparatus, a method, a means for performing acts, or a machine readable medium including instructions that, when performed by the machine, that can cause the machine to perform acts), such as can include a rotation sensor assembly comprising: a base; a rotated component rotatably coupled with the base, the rotated component includes a rotation angle relative to the base; and a rotation position sensor assembly comprising: a transmitter coupled with one of the base or the rotated component, the transmitter generates a magnetic field including a sinusoidally time-varying dipole near-field corresponding to an excitation signal having a first phase value, a receiver coupled with the other of the rotated component or the base, the receiver is configured to detect the magnetic field and generate a reception signal based on the magnetic field with a second phase value corresponding to the rotation angle of the rotated component, wherein the receiver is mechanically isolated from the transmitter, and a rotation angle module coupled with the transmitter, the rotation angle module configured to measure the rotation angle of the rotated component based on the phase difference in the first and second phase values.

Example 14 can include, or can optionally be combined with the subject matter of Examples 1-13 to optionally include wherein one or both of the transmitter or receiver are surrounded with hardened enclosures, and the hardened enclosures include signal ports, a signal coupling extends through the signal ports, and the signal coupling is electrically coupled with the transmitter and receiver and the rotation angle module.

Example 15 can include, or can optionally be combined with the subject matter of Examples 1-14 to optionally include wherein the hardened enclosure surrounds: an antenna module including one of the transmitter and receiver, an amplification module electrically coupled with the antenna module, and a bottom board electrically coupled with the amplification module and the signal port.

Example 16 can include, or can optionally be combined with the subject matter of Examples 1-15 to optionally include wherein the rotated component includes a steering knuckle.

Example 17 can include, or can optionally be combined with the subject matter of Examples 1-16 to optionally include wherein the base includes a vehicle body.

Example 18 can include, or can optionally be combined with the subject matter of Examples 1-17 to optionally include wherein the transmitter includes first and second transmitting coils at right angles to each other.

Example 19 can include, or can optionally be combined with the subject matter of Examples 1-18 to optionally include wherein the receiver includes first and second receiving coils at right angles to each other.

Example 20 can include, or can optionally be combined with the subject matter of Examples 1-19 to optionally include wherein the rotation angle module includes a steering angle module; and the rotation sensor assembly comprises a calibration steering angle module coupled with the transmitter and receiver, wherein the calibration steering angle module is configured to associate a reference steering angle with a reference phase value of the reception signal based on the magnetic field including the sinusoidally time-varying dipole near-field.

Example 21 can include, or can optionally be combined with the subject matter of Examples 1-20 to optionally include wherein the transmitter includes a permanent magnet.

Example 22 can include, or can optionally be combined with the subject matter of Examples 1-21 to optionally include wherein the receiver includes one or more Hall Effect sensors.

Example 23 can include, or can optionally be combined with the subject matter of Examples 1-22 to optionally include wherein the receiver includes at least two Hall Effect sensors arranged at right angles to each other and parallel to a plane of rotation of the transmitter.

Example 24 can include, or can optionally be combined with the subject matter of Examples 1-23 to include, subject matter (such as an apparatus, a method, a means for performing acts, or a machine readable medium including instructions that, when performed by the machine, that can cause the machine to perform acts), such as can include A method for using a rotational position sensor comprising: generating a magnetic field based on an excitation signal having a first phase value using a transmitting coil assembly, wherein the magnetic field includes a sinusoidally time-varying dipole near-field; detecting the magnetic field with a receiving coil assembly, the receiving coil assembly rotatable relative to and mechanically isolated from the transmitting coil assembly; generating a reception signal having a second phase value with the receiving coil assembly, the second phase value varies from the first phase value according to rotation of one or the other or both of the transmitting and receiving coil assemblies relative to the other of the receiving and transmitting coil assemblies; wherein one or both of the transmitting and receiving coil assemblies include two or more coils: where the transmitting coil assembly includes two or more transmitting coils, generating the magnetic field includes generating respective magnetic field components with each of the transmitting coils, and the magnetic field component generated by each of the transmitting coils has an amplitude and phase shift relative to the other magnetic field components such that the magnetic field is a rotating magnetic dipole near-field whose rotation angle increases directly as the first phase value, and where the receiving coil assembly includes two or more receiving coils, generating the reception signal includes generating component reception signals with each of the receiving coils, and each of the component reception signals is weighted and phase-shifted such that the reception signal is the same as the reception signal generated by two virtual receiving coils the axes of which are 90 degrees apart, and the reception signal is the equally weighted sum of respective component reception signals generated by each of the two virtual receiving coils, the two component signals being phase-shifted 90 degrees relative to each other before summing; and determining the rotational position of one or more of the transmitting or receiving coil assembly relative to the other of the receiving coil or the transmitting coil assembly by measuring a difference between the first and second phase values.

Example 25 can include, or can optionally be combined with the subject matter of Examples 1-24 to optionally include wherein generating the magnetic field includes generating the magnetic field from the transmitting coil assembly coupled with one of an assembly base or a steered component movable relative to the assembly base.

Example 26 can include, or can optionally be combined with the subject matter of Examples 1-25 to optionally include wherein measuring the difference between the first and second phase values includes determining a steering angle of the steered component relative to the assembly base according to the measured difference.

Example 27 can include, or can optionally be combined with the subject matter of Examples 1-26 to optionally include wherein detecting the magnetic field includes detecting the magnetic field with the receiving coil assembly coupled with one of an assembly base or a steered component movable relative to the assembly base.

Example 28 can include, or can optionally be combined with the subject matter of Examples 1-27 to optionally include rotating one of the transmitting and receiving coil assembly relative to the other coil assembly, wherein at least one of the transmitting and receiving coil assembly include two or more coils, and the coils are parallel to a coil plane, and the coils of at least one of the transmitting and receiving coil assemblies rotate parallel to the coil plane.

Example 29 can include, or can optionally be combined with the subject matter of Examples 1-28 to optionally include wherein both of the transmitting and receiving coil assemblies each include two or more coils, and determining the rotational position of one or more of the transmitting or receiving coil assembly includes both: determining the rotational position of the transmitting coil assembly relative to the receiving coil assembly, and determining the rotational position of the receiving coil assembly relative to the transmitting coil assembly.

Example 30 can include, or can optionally be combined with the subject matter of Examples 1-29 to optionally include wherein generating the magnetic field includes generating magnetic field components with first and second transmitting coils oriented at a right angle relative to each other.

Example 31 can include, or can optionally be combined with the subject matter of Examples 1-30 to optionally include wherein detecting the magnetic field includes detecting the magnetic field with first and second receiving coils oriented at a right angle relative to each other.

Example 32 can include, or can optionally be combined with the subject matter of Examples 1-31 to optionally include wherein measuring the difference between the first and second phase values includes measuring the difference with a phase detector electrically coupled between the transmitting and receiving coil assemblies.

Example 33 can include, or can optionally be combined with the subject matter of Examples 1-32 to optionally include transmitting a reference signal to the phase detector, the reference signal corresponds to the excitation signal with the first phase value; and transmitting the reception signal with the second phase value from the receiving coil assembly to the phase detector.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A rotational position sensor comprising:
a transmitting coil assembly configured to generate a magnetic field based on an excitation signal having a first phase value, wherein the magnetic field is a sinusoidally time-varying dipole near-field;
a receiving coil assembly configured to detect the magnetic field generated by the transmitting coil assembly and to generate a reception signal having a second phase value varying from the first phase value according to rotation of one or the other or both of the transmitting and receiving coil assemblies relative to the other of the receiving and transmitting coil assemblies, respectively;
wherein at least one of the transmitting and receiving coil assemblies includes two or more transmitting or receiving coils, respectively:
where the transmitting coil assembly includes two or more transmitting coils, the magnetic field generated by the transmitting coil assembly includes respective magnetic field components generated by each of the transmitting coils, and the magnetic field component generated by each of the transmitting coils has an amplitude and phase shift relative to the other magnetic field components such that the magnetic field is a rotating magnetic dipole near-field whose rotation angle increases directly as the first phase value, and
where the receiving coil assembly includes two or more receiving coils, the reception signal includes component reception signals generated by each of the receiving coils, and each of the component reception signals is weighted and phase-shifted such that the reception signal is the same as the reception signal generated by two virtual receiving coils the axes of which are 90 degrees apart, and the reception signal is the equally weighted sum of respective component reception signals generated by each of the two virtual receiving coils, the two component signals being phase-shifted 90 degrees relative to each other before summing; and
a phase detector coupled with the transmitting and receiving coil assemblies and configured to measure a difference between the first and second phase values, and determine one or more of the rotational position of the transmitting coil assembly relative to the receiving coil assembly or the rotational position of the receiving coil assembly relative to the transmitting coil assembly based on the difference in phase value.

2. The rotational position sensor of claim 1, wherein the two or more transmitting coils include first and second transmitting coils at right angles relative to each other.

3. The rotational position sensor of claim 1, wherein the transmitting and receiving coils are parallel to a coil plane, and at least one of the transmitting and receiving coils are rotatable parallel to the coil plane.

4. The rotational position sensor of claim 1, wherein the second phase value of the reception signal directly varies according to rotation of the transmitting coil assembly.

5. The rotational position sensor of claim 1, wherein the phase detector is electrically coupled with the transmitting and receiving coil assemblies with a signal coupling, and the transmitting coil assembly is configured to transmit a reference signal based on the excitation signal with the first phase value through the signal coupling.

6. The rotational position sensor of claim 5, wherein the receiving coil assembly is configured to transmit the reception signal through the signal coupling.

7. The rotational position sensor of claim 1, wherein the receiving coil assembly including two or more receiving coils includes first and second receiving coils, and the first and second receiving coils are at right angles relative to each other.

8. The rotational position sensor of claim 7, wherein the receiving coil assembly is configured to generate the reception signal having the second phase value varying from the first phase value according to rotation of the receiving coil assembly.

9. The rotational position sensor of claim 1, wherein the transmitting coil assembly including two or more transmitting coils includes first and second transmitting coils, and the first and second transmitting coils are at right angles relative to each other.

10. The rotational position sensor of claim 9, wherein the receiving coil assembly is configured to generate the reception signal having the second phase value varying from the first phase value according to rotation of the transmitting coil assembly.

11. The rotational position sensor of claim 1, wherein the transmitting and receiving coil assemblies are only coupled through the electrical coupling and the magnetic dipole field.

12. The rotational position sensor of claim 1, wherein the transmitting coil assembly includes first and second transmitting coils and the receiving coil assembly includes first and second receiving coils, and
the receiving coil assembly is configured to generate the reception signal having the second phase value varying from the first phase value according to rotation of one or both of the transmitting or receiving coil assemblies.

13. A method for using a rotational position sensor comprising:
generating a magnetic field based on an excitation signal having a first phase value using a transmitting coil assembly, wherein the magnetic field includes a sinusoidally time-varying dipole near-field;
detecting the magnetic field with a receiving coil assembly, the receiving coil assembly rotatable relative to and mechanically isolated from the transmitting coil assembly;
generating a reception signal having a second phase value with the receiving coil assembly, the second phase value varies from the first phase value according to rotation of one or the other or both of the transmitting and receiving coil assemblies relative to the other of the receiving and transmitting coil assemblies; wherein one or both of the transmitting and receiving coil assemblies include two or more coils:
where the transmitting coil assembly includes two or more transmitting coils, generating the magnetic field includes generating respective magnetic field components with each of the transmitting coils, and the magnetic field component generated by each of the transmitting coils has an amplitude and phase shift relative to the other magnetic field components such that the magnetic field is a rotating magnetic dipole near-field whose rotation angle increases directly as the first phase value, and
where the receiving coil assembly includes two or more receiving coils, generating the reception signal includes generating component reception signals with each of the receiving coils, and each of the component reception signals is weighted and phase-shifted such that the reception signal is the same as the reception signal generated by two virtual receiving coils the axes of which are 90 degrees apart, and the reception signal is the equally weighted sum of respective component reception signals generated by each of the two virtual receiving coils, the two component signals being phase-shifted 90 degrees relative to each other before summing; and
determining the rotational position of one or more of the transmitting or receiving coil assembly relative to the other of the receiving coil or the transmitting coil assembly by measuring a difference between the first and second phase values.

14. The method of claim 13, wherein generating the magnetic field includes generating the magnetic field from the transmitting coil assembly coupled with one of an assembly base or a steered component movable relative to the assembly base.

15. The method of claim 14, wherein measuring the difference between the first and second phase values includes determining a steering angle of the steered component relative to the assembly base according to the measured difference.

16. The method of claim 13, wherein detecting the magnetic field includes detecting the magnetic field with the receiving coil assembly coupled with one of an assembly base or a steered component movable relative to the assembly base.

17. The method claim 13 comprising rotating one of the transmitting and receiving coil assembly relative to the other coil assembly, wherein at least one of the transmitting and receiving coil assembly include two or more coils, and the coils are parallel to a coil plane, and the coils of at least one of the transmitting and receiving coil assemblies rotate parallel to the coil plane.

18. The method of claim 17, wherein both of the transmitting and receiving coil assemblies each include two or more coils, and
determining the rotational position of one or more of the transmitting or receiving coil assembly includes both:
determining the rotational position of the transmitting coil assembly relative to the receiving coil assembly, and
determining the rotational position of the receiving coil assembly relative to the transmitting coil assembly.

19. The method of claim 13, wherein generating the magnetic field includes generating magnetic field components with first and second transmitting coils oriented at a right angle relative to each other.

20. The method of claim 13, wherein detecting the magnetic field includes detecting the magnetic field with first and second receiving coils oriented at a right angle relative to each other.

21. The method of claim 13, wherein measuring the difference between the first and second phase values includes measuring the difference with a phase detector electrically coupled between the transmitting and receiving coil assemblies.

22. The method of claim 21 comprising:
 transmitting a reference signal to the phase detector, the reference signal corresponds to the excitation signal with the first phase value; and
 transmitting the reception signal with the second phase value from the receiving coil assembly to the phase detector.

* * * * *